(12) United States Patent
Shilman et al.

(10) Patent No.: US 7,729,538 B2
(45) Date of Patent: Jun. 1, 2010

(54) SPATIAL RECOGNITION AND GROUPING OF TEXT AND GRAPHICS

(75) Inventors: Michael Shilman, Seattle, WA (US); Paul A. Viola, Kirkland, WA (US); Kumar H. Chellapilla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1058 days.

(21) Appl. No.: 10/927,452

(22) Filed: Aug. 26, 2004

(65) Prior Publication Data

US 2006/0045337 A1 Mar. 2, 2006

(51) Int. Cl.
*G06K 9/00* (2006.01)

(52) U.S. Cl. ............... 382/181; 382/186; 382/187

(58) Field of Classification Search ............ 382/181, 382/186, 187
See application file for complete search history.

(56) References Cited

U.S. PATENT DOCUMENTS

| | | | | |
|---|---|---|---|---|
| 3,701,095 | A * | 10/1972 | Yamaguchi et al. | 382/156 |
| 4,955,066 | A | 9/1990 | Notenboom | |
| 5,109,433 | A | 4/1992 | Notenboom | |
| 5,181,255 | A | 1/1993 | Bloomberg | |
| 5,237,628 | A | 8/1993 | Levitan | |
| 5,297,216 | A | 3/1994 | Sklarew | |
| 5,465,353 | A * | 11/1995 | Hull et al. | 707/5 |
| 5,499,294 | A | 3/1996 | Friedman | |
| 5,526,444 | A * | 6/1996 | Kopec et al. | 382/233 |
| 5,542,006 | A * | 7/1996 | Shustorovich et al. | 382/156 |
| 5,594,809 | A * | 1/1997 | Kopec et al. | 382/161 |
| 5,699,244 | A | 12/1997 | Clark et al. | |
| 5,812,698 | A * | 9/1998 | Platt et al. | 382/186 |
| 5,832,474 | A | 11/1998 | Lopresti et al. | |
| 5,867,597 | A * | 2/1999 | Peairs et al. | 382/209 |
| 5,999,653 | A | 12/1999 | Rucklidge et al. | |
| 6,137,908 | A * | 10/2000 | Rhee | 382/187 |
| 6,233,353 | B1 | 5/2001 | Danisewicz | |
| 6,279,014 | B1 | 8/2001 | Schilit et al. | |
| 6,356,922 | B1 | 3/2002 | Schilit et al. | |
| 6,393,395 | B1 * | 5/2002 | Guha et al. | 704/232 |

(Continued)

OTHER PUBLICATIONS

"Neural Learning using AdaBoost," Yi Murphey, Zhiltang Chen, Hong Guo.*

(Continued)

*Primary Examiner*—Bhavesh M Mehta
*Assistant Examiner*—Michael Vanchy, Jr.
(74) *Attorney, Agent, or Firm*—Lee & Hayes, PLLC

(57) ABSTRACT

The present invention leverages spatial relationships to provide a systematic means to recognize text and/or graphics. This allows augmentation of a sketched shape with its symbolic meaning, enabling numerous features including smart editing, beautification, and interactive simulation of visual languages. The spatial recognition method obtains a search-based optimization over a large space of possible groupings from simultaneously grouped and recognized sketched shapes. The optimization utilizes a classifier that assigns a class label to a collection of strokes. The overall grouping optimization assumes the properties of the classifier so that if the classifier is scale and rotation invariant the optimization will be as well. Instances of the present invention employ a variant of AdaBoost to facilitate in recognizing/classifying symbols. Instances of the present invention employ dynamic programming and/or A-star search to perform optimization. The present invention applies to both hand-sketched shapes and printed handwritten text, and even heterogeneous mixtures of the two.

44 Claims, 19 Drawing Sheets

U.S. PATENT DOCUMENTS

| | | | |
|---|---|---|---|
| 6,397,212 | B1 | 5/2002 | Biffar |
| 6,470,094 | B1 | 10/2002 | Lienhart et al. |
| 6,487,301 | B1 | 11/2002 | Zhao |
| 6,523,134 | B2 | 2/2003 | Korenshtein |
| 6,546,385 | B1 | 4/2003 | Mao et al. |
| 6,580,806 | B1 | 6/2003 | Sato |
| 6,587,217 | B1 | 7/2003 | Lahey et al. |
| 6,594,393 | B1 * | 7/2003 | Minka et al. ............... 382/218 |
| 6,658,623 | B1 | 12/2003 | Schilit et al. |
| 6,687,876 | B1 | 2/2004 | Schilit et al. |
| 6,869,023 | B2 | 3/2005 | Hawes |
| 6,928,548 | B1 | 8/2005 | Hale et al. |
| 6,938,203 | B1 | 8/2005 | Dimarco et al. |
| 7,010,751 | B2 | 3/2006 | Shneiderman |
| 7,024,054 | B2 | 4/2006 | Cahill et al. |
| 7,062,497 | B2 | 6/2006 | Hamburg et al. |
| 7,111,230 | B2 | 9/2006 | Euchner et al. |
| 7,120,299 | B2 | 10/2006 | Keskar et al. |
| 7,327,883 | B2 * | 2/2008 | Polonowski ............... 382/182 |
| 7,373,291 | B2 * | 5/2008 | Garst ........................... 704/4 |
| 2002/0032698 | A1 * | 3/2002 | Cox ........................ 707/501.1 |
| 2002/0078088 | A1 | 6/2002 | Kuruoglu et al. |
| 2002/0116379 | A1 | 8/2002 | Lee et al. |
| 2003/0076537 | A1 | 4/2003 | Brown |
| 2003/0123733 | A1 | 7/2003 | Keskar et al. |
| 2003/0152293 | A1 | 8/2003 | Bresler et al. |
| 2004/0003261 | A1 | 1/2004 | Hayashi |
| 2004/0015697 | A1 | 1/2004 | de Queiroz |
| 2004/0078757 | A1 | 4/2004 | Golovchinsky et al. |
| 2004/0090439 | A1 * | 5/2004 | Dillner ....................... 345/440 |
| 2004/0107348 | A1 | 6/2004 | Iwamura |
| 2004/0189667 | A1 * | 9/2004 | Beda et al. .................. 345/619 |
| 2004/0205542 | A1 | 10/2004 | Bargeron et al. |
| 2004/0205545 | A1 | 10/2004 | Bargeron et al. |
| 2004/0252888 | A1 | 12/2004 | Bargeron et al. |
| 2005/0138541 | A1 | 6/2005 | Euchner et al. |
| 2005/0165747 | A1 | 7/2005 | Bargeron et al. |
| 2006/0045337 | A1 | 3/2006 | Shilman et al. |
| 2006/0050969 | A1 | 3/2006 | Shilman et al. |

OTHER PUBLICATIONS

S. Marinai, et al., "Recognizing Freeform Digital Ink Annotations" Proceedings of the 6th International Workshop on Document Analysis Systems, 2004, vol. 2163, pp. 322-331.

G. Golovchinsky, et al., "Moving Markup: Repositioning Freeform Annotation" UIST 02. Proceedings of the 15th Annual ACM Symposium on user Interface Software and Technology, 2002, vol. conf. 15, pp. 21-29.

European Search Report dated Dec. 29, 2006, mailed for European Patent Application Serial No. 05 108 068.7, 2 Pages.

Michael Shilman, et al., Spatial Recognition And Grouping Of Text And Graphics, Eurographics Workshop On Sketch-Based Interfaces And Modeling, 2004.

Michael Shilman, et al., Recognition And Grouping Of Handwritten Text In Diagrams And Equations, IWFHR 2004, Sep. 2004, Toyko, Japan.

U.S. Appl. No. 11/095,393, Bargeron, et al.

U.S. Appl. No. 11/165,070, David Bargeron.

U.S. Appl. No. 11/171,064, David Bargeron.

European Search Report dated Feb. 1, 2006 for European Patent Application No. EP05000750. 7 pages.

J.J. Hull. "Document Image Matching and Retrieval with Multiple Distortion-Invariant Descriptors". Document Analysis Systems, World Scientific Publishing Co. 1995. pp. 379-396, Retrieved from the internet: http://rii.richoh.com/{hull/pubs/hull_das94.pdf>. Retrieved on Dec. 6, 2005.

J.J. Hull, et al. "Document Image Matching Techniques". Symposium on Document Image Understanding Technology, Apr. 30, 1997, pp. 31-35.

Wang Shin-Ywan, et al. "Block selection: a method for segmenting a page image of various editing styles." Document Analysis and Recognition, 1995. Proceedings of the Third International Conference on Montreal, Quebec, Canada. Aug. 14-16, 1995. pp. 128-133. Los Alamitos, CA, USA, IEEE Computer Soc., US, vol. 1.

V. Eglin, et al. "Document page similarity based on layout visual saliency: application to query by example and document classification". Document Analysis and Recognition, 2003. Proceedings of the 7th International Conference. Aug. 3-6, 2003. Piscataway, NJ. IEEE, Aug. 3, 2003, pp. 1208-1212.

C.L. Tan, et al. "Text extraction using pyramid." Pattern Recognition, Jan. 1998, pp. 63-72, vol. 1, No. 1, Elsevier, Kidlington, GB.

H. Peng, et al. "Document image template matching based on component block list". Pattern Recognition Letters, Jul. 2001, pp. 1033-1042, vol. 22, No. 9, North-Holland Publ. Amsterdam, NL.

D. Doermann. "The Index and Retrieval of Document Images: A Survey". Computer Vision and Image Understanding, Jun. 1998, pp. 287-298, vol. 70, No. 3, Academic Press, San Diego, CA, US.

D. Doermann, et al. "The detection of duplicates in document image databases." Proceedings of the 4th International Conference on Document Analysis and Recognition. Ulm, Germany, Aug. 18-20, 1997, pp. 314-318, Proceedings of the ICDAR, Los Alamitos, IEEE Comp. Soc. US, vol. II.

S. Mitaim, et al. "Neutral fuzzy agents that learn a user's preference map". Digital Libraries, 199. ADL '97. Proceedings, IEEE International Forum on Research and Technology Advances in Washington, D.C. , US May 7-9, 1997, Los Alamitos, IEEE Comp. Soc. US, May 7, 1997, pp. 25-35.

B. Erol, et al. "Institute of Electrical and Electronics Engineers: Linking presentation documents using image analysis". Conference Record of the 37th Asilomar Conference on Signals, Systems, & Computers. Pacific Grove, CA, US, Nov. 9-12, 2003. p. 97-101. Asilomar Conference on Signals, Systems and Computers, New York, NY, IEEE, vol. 1 of 2.

Benolin Jose, et al. "Vector Based Image Matching for Indexing in Case Based Reasoning Systems". 4th German Workshop on Case-based Reasoning-System Development and Evaluation, 1996, pp. 1#7.

R. Hauck. Partial European Search Report. Apr. 15, 2005. 2 pages. Munich, Germany.

Tung-Shou Chen, et al., "A New Search Engine for Chinese Document Image Retrieval Based on Chinese Character Segmentation Features". International Journal of Computer Processing of Oriental Languages, 2002, pp. 417-431. vol. 14, No. 4.

Jonathan J. Hull, et al., "Document Image Similarity and Equivalence Detection". ICDAR'97, 1997, pp. 308-312, vol. 1, Ulm, Germany.

John F. Cullen, et al., "Document Image Database Retrieval and Browsing using Texture Analysis". ICDAR'97, 1997, pp. 718-721, Ulm, Germany.

Nevin Heintze, "Scalable Document Fingerprinting (Extended Abstract)". Proceedings of the Second USENIX Workshop on Electronic Commerce, 1996, pp. 1-10.

Narayanan Shivakumar, et al., "The SCAM Approach to Copy Detection in Digital Libraries". D-Lib Magazine, 1995, 9 pages.

Sergey Brin, et al., "Copy Detection Mechanisms for Digital Documents". Proceedings of the ACM SIGMOD Annual Conference, 1995, pp. 1-21.

Michael Collins, et al., "Logistic Regression, AdaBoost, and Bregman Distances", Machine Learning, 48(1/2/3) 2002, pp. 1-26.

Thomas M. Cormen, et al., "Introduction to Algorithms", Cambridge, MA: The MIT Press, 1990, p. 448.

Hans P. Graf, et al., "Analysis of Complex and Noisy Check Images", Proceedings of IEEE International Conference on Image Processing (KIP-95). IEEE Computer Society Press, 1995, pp. 316-319.

Patrice Y. Simard, et al., "An Efficient Binary Image Activity Detector Based on Connected Components", International Conference on Accoustic, Speech and Signal Processing (ICASSP), Montreal, May 2004, p. 229-232.

Yoav Freund, et al., "Experiments with a New Boosting Algorithm". Machine Learning: Proceedings of the Thirteenth International Conference, 1996. pp. 148-156.

Ihsin Phillips, et al., "CD-ROM Document Database Standard" Proc. Second Int'l Conf. on Document Analysis and Recognition, 1993, pp. 478-483.

Yefeng Zheng, et al., "Machine Printed Text and Handwriting Identification in Noisy Document Images" In IEEE Transactions on Pattern Analysis and Machine Intelligence, Mar. 2003, pp. 337-353, vol. 26, No. 3.

David Bargeron, et al. "Boosting-Based Transductive Learning for Text Detection". Proceedings of the 8th International Conference on Document Analysis and Recognition (ICDAR'05), pp. 1166-1171.

Michael Shilman, et al., "Recognizing Freeform Digital Ink Annotations", IAPR International Workshop on Document Analysis Systems, Sep. 8-10, 2004, 12 pages, Florence, Italy.

Ming Ye, et al., "Document Image Matching and Annotation Lifting". Proceedings of the 6th International Conference on Document Analysis and Recognition (ICDAR 2001), Seattle, Washington, Sep. 10-13, 2001, pp. 753-760.

"About Virtual Desktop Managers". Accessible at http://www.virtual-desktop.info. Last accessed on May 17, 2006, 3 pages.

Vladimir N. Vapnik, Statistical Learning Theory, 1998, pt. 1, 62 pages (front cover-40).

Vladimir N. Vapnik, Statistical Learning Theory, 1998, pt. 2, 62 pages (41-100).

Vladimir N. Vapnik, Statistical Learning Theory, 1998, pt. 3, 62 pages (101-162).

Vladimir N. Vapnik, Statistical Learning Theory, 1998, pt. 4, 62 pages (163-226).

Vladimir N. Vapnik, Statistical Learning Theory, 1998, pt. 5, 60 pages (227-287).

Vladimir N. Vapnik, Statistical Learning Theory, 1998, pt. 6, 60 pages (288-348).

Vladimir N. Vapnik, Statistical Learning Theory, 1998, pt. 7, 62 pages (349-413).

Vladimir N. Vapnik, Statistical Learning Theory, 1998, pt. 8, 50 pages (414-464).

Vladimir N. Vapnik, Statistical Learning Theory, 1998, pt. 9, 41 pages (465-505).

Vladimir N. Vapnik, Statistical Learning Theory, 1998, pt. 10, 35 pages (506-540).

Vladimir N. Vapnik, Statistical Learning Theory, 1998, pt. 11, 35 pages (541-576).

Vladimir N. Vapnik, Statistical Learning Theory, 1998, pt. 12, 65 pages (577-642).

Vladimir N. Vapnik, Statistical Learning Theory, 1998, pt. 13, 45 pages (643-686).

Vladimir N. Vapnik, Statistical Learning Theory, 1998, pt. 14, 50 pages (687-back cover).

Vinajak R. Borkar, et al., Automatically extracting structure from free text addresses, 2000, In Bulletin of the IEEE Computer Society Technical committee on Data Engineering. IEEE.

Remco Bouckaert, Low level information extraction: A bayesian network based approach, 2002, In Proc. TextML 2002, Sydney, Australia.

Claire Cardie, et al., Proposal for an interactive environment for information extraction, 1998, Technical Report TR98-1702, 2.

Rich Caruana, et al., High precision information extraction, Aug. 2000, In KDD-2000 Workshop on Text Mining.

M. Collins, Discriminative training methods for hidden markov models : Theory and experiments with perceptron algorithms, 2002, In Proceedings of Empirical Methods in Natural Language Processing (EMNLP02).

Corinna Cortes, et al., Support-vector networks. Machine Learning, 1995, 20(3):273{297.

Y. Freund, et al., Large margin classification using the perceptron algorithm, Machine earning, 37(3):277{296.

Y. Freund, et al., Experiments with a new boosting algorithm, 1996, In International Conference on Machine Learning, pp. 148{156.

T. Kristjansson, et al., Interactive information extraction with constrained conditional random fields, 2004, In Proceedings of the 19th international conference on artificial intelligence. AAAI. pages 412{418.

John Lafferty, et al., Conditional random fields: Probabilistic models for segmenting and labeling sequence data, 2001, In Proc. 18th International Conf. on Machine Learning, pp. 282{289. Morgan Kaufmann, San Francisco, CA.

M. Marcus, et al., The penn treebank: Annotating predicate argument structure, 1994.

Andrew McCallum, Efficiently inducing features of conditional random fields, 2003, In Nineteenth Conference on Uncertainty in Artificial Intelligence (UAI03).

Andrew McCallum, et al., Early results for named entity recognition with conditional random fields, feature induction and web-enhanced lexicons, 2003, In Marti Hearst and Mari Ostendorf, editors, HLT-NAACL, Association for Computational Linguistics, Edmonton, Alberta, Canada.

Kamal Nigam, et al., Using maximum entropy for text classification, 1999, In IJCAI'99 Workshop on Information Filtering.

David Pinto, et al., Table extraction using conditional random fields, 2003, In Proceedings of the ACM SIGIR.

L.R. Rabiner, A tutorial on hidden markov models and selected applications in speech recognition, 1989, In Proc. of the IEEE, vol. 77, pp. 257{286.

Fei Sha, et al., Shallow parsing with conditional random fields. In Marti Hearst and Mari Ostendorf, editors, 2003, HLT-NAACL: Main Proceedings, pp. 213{220, Association for Computational Linguistics, Edmonton, Alberta, Canada.

J. Stylos, et al., Citrine:providing intelligent copy-and-paste, 2005, In Proceedings of ACM Symposium on User Interface Software and Technology (UIST 2004), pp. 185{188.

B. Tasker, et al., Max-margin parsing, 2004, In Empirical Methods in Natural Language Processing (EMNLP04).

S. Mao, et al., Document structure analysis algorithms: A literature survey, Jan. 2003, vol. 5010, pp. 197-207, In Proc. SPIE Electronic Imaging.

M. Krishnamoorthy, et al., Syntactic segmentation and labeling of digitized pages from technical journals, 1993, IEEE Transactions on Pattern Analysis and Machine Intelligence. vol. 15. pp. 737-747.

J. Kim, et al., Automated labeling in document images, Jan. 2001, In Document Recognition and Retrieval VIII, vol. 4307.

D. Niyogi, et al., Knowledge-based derivation of document logical structure, 1995, In Third International Conference on Document Analysis and Recognition, Montreal, Canada.

A. Conway, Page grammars and page parsing. a syntactic approach to document layout recognition, 1993, in Proceedings of the Second International Conference on Document Analysis and Recognition, Tsukuba Science City, pp. 761-764, Japan.

E. G. Miller, et al., Ambiguity and constraint in mathematical expression recognition, 1998, In Proceedings of the National Conference of Artificial Intelligence. American Association of Artificial Intelligence.

T. Tokuyasu, et al., Turbo recognition: a statistical approach to layout analysis, 2001, in Proceedings of the SPIE, pp. 123-129, vol. 4307, San Jose, CA.

T. Kanungo, et al., Stochastic language model for style-directed physical layout analysis of documents, 2003, In IEEE Transactions on Image Processing, vol. 5, No. 5.

D. Blostein, et al., Applying compiler techniques to diagram recognition, in Proceedings of the Sixteenth International Conference on Pattern Recognition, pp. 123-136, vol. 3, 2002.

J. F. Hull, Recognition of mathematics using a two dimensional trainable context-free grammar, Master's thesis, MIT, Jun. 1996.

N. Matsakis, Recognition of handwritten mathematical expressions, May 1999, Master's thesis, Massachusetts Institute of Technology, Cambridge, MA.

J. Lafferty, et al., Conditional random fields: Probabilistic models for segmenting and labeling sequence data, 2001, In Proc. 18th International Conf. on Machine Learning, pp. 282-289, Morgan Kaufmann, San Francisco, CA.

E. Charniak, et al., Edge-based best-first chart parsing, 1998, In Proceedings of the Fourteenth National Conference on Artificial Intelligence, pp. 127-133.

D. Klein, et al., A* parsing: Fast exact viterbi parse selection, 2001, Stanford University, Tech. Rep. dbpubs/2002-16.

Y. Freund, et al., A decision-theoretic generalization of on-line learning and an application to boosting, 1995, In Computational Learning Theory: Eurocolt '95, Springer-Verlag, pp. 23-37.

I. Philips, et al., Cd-rom document database standard, 1993, in Proceedings of 2nd International Conference on Document Analysis and Recognition.

P. Viola, et al., Rapid object detection using a boosted cascade of simple features, 2001, In Proceedings of the IEEE Conference on Computer Vision and Pattern Recognition.

T. Breuel, High performance document layout analysis, in 2003 Symposium on Document Image Understanding Technology, Greenbelt Maryland.

R. Zanibbi, et al., A survey of table recognition: Models, observations, transformations, and inferences, 2004, International Journal of Document Analysis and Recognition, pp. 1-16, vol. 7, No. 1.

K.-F. Chan, et al., Mathematical expression recognition: a survey, 2000, International Journal on Document Analysis and Recognition, pp. 3-15, vol. 3.

E. Charniak, Statistical techniques for natural language parsing, 1997, AI Magazine.

M. Kay, Chart Generation, 1996, in Proceedings of the 34th conference on Association for Computational Linguistics. Association for Computational Linguistics, pp. 200-204.

M. Viswanathan, et al., Document Recognition: An attribute Grammar Approach, Mar. 1996, In Proc. SPIE vol. 2660, p. 101-111, Document Recognition III, Luc M. Vincent; Jonathan J. Hull; Eds., pp. 101-111.

C. D. Manning, et al., Foundations of Statistical Natural Language Processing. The MIT Press, 1999.

Tobias Schefer, et al., Active Hidden Markov Models For Information Extraction. In Advances in Intelligent Data Analysis, 4th International Conference, IDA 2001, 2001.

P. Chou, "Recognition Of Equations Using A 2-D Stochastic Context-Free Grammar," in SPIE Conference on Visual Communications and Image Processing, Philadelphia, PA, 1989.

M. Kay, "Algorithm Schemata And Data Structures In Syntactic Processing," pp. 35-70, 1986.

Sriram Ramachandran and Ramanujan Kashi, "An Architecture for ink Annotations on Web Documents", Proceedings of the Seventh International Conference on Document Analysis and Recognition, Aug. 3-6, 2003 pp. 256-260 vol. 1 Retrieved from IEEE Xplore on Sep. 27, 2006.

Ivan Poupyrev, Numada Tomokazu and Suzanne Weghorst, "Virtual Notepad: Handwriting in Immersive VR", IEEE, Proceedings of VRAIS' Atlanta, Georgia, Mar. 1998 Retrieved from CiteSeer on Sep. 28, 2006.

Marcel Gotze, Stefan Schlechtweg and Thomas Strothotte, "The Intelligent Pen—Toward a Uniform Treatment of Electronic Documents", 2002 Retrieved from CiteSeer on Sep. 28, 2006.

Bengio, et al., "World Normalization for On-Line Handwritten Word Recognition", IIEE Transactions, retrieved on May 6, 2009 at <<IIEE XPLORE>>, pp. 409-413.

European Office Action for European Patent Application No. 05107713.9, mailed May 12, 2009 (9 pages).

Bargeron et al., "Reflowing Digital Ink Annotations," Paper: Techniques for On-screen Shapes, Text and Handwriting. CHI 2003, Apr. 5-10, 2003, Ft. Lauderdale, Florida, USA., vol. 5, Issue No. 1, pp. 385-392. http://www.dgp.toronto.edu/~tomer/store/papers/reflowchi03.pdf. Last accessed Nov. 4, 2008, 8 pages.

Ellis et al, "A Collaborative Annotation System for Data Visualization," Proceedings of the working conference on Advanced Visual Interfaces, May 25-28, 2004, ACM 1-58113-867-9/04/0500, pp. 411-414 http://delivery.acm.org/10.1145/990000/989938/p411-ellis.pdf?key1=989938&key2=1838085221&coll=GUIDE& dl=GUIDE& CFID=9420863&CFTOKEN=15500950. Last accessed Nov. 4, 2008, 4 pages.

OA Dated Jul. 25, 2008 for U.S. Appl. No. 11/171,064, 15 pages.
OA Dated Feb. 5, 2009 for U.S. Appl. No. 10/934,306, 42 pages.
OA Dated Nov. 18, 2008 for U.S. Appl. No. 11/095,393, 53 pages.
OA Dated Oct. 3, 2008 for U.S. Appl. No. 11/165,070, 11 pages.
OA Dated Jul. 28, 2008 for U.S. Appl. No. 10/934,306, 34 pages.

Lienhart, et al. Empirical Analysis of Detection Cascades of Boosted Classifiers for Rapid Object Detection. In DAGM, 2003, pp. 297-304.

Taira, et al. Text categorization Using Transductive Boosting. Proceedings of ECML-01, 12th European Conference on Machine Learning. Freiburg, DE, Springer Verlag, Heidelberg, DE: 445-465.

* cited by examiner

SPATIAL RECOGNITION AND GROUPING OF TEXT AND GRAPHICS

TECHNICAL FIELD

The present invention relates generally to recognition, and more particularly to systems and methods for grouping and recognizing text and/or graphics.

BACKGROUND OF THE INVENTION

Computers have become an integral part of society. Every day people become more dependent on computers to facilitate both work and leisure activities. A significant drawback to computing technology is its "digital" nature as compared to the "analog" world in which it functions. Computers operate in a digital domain that requires discrete states to be identified in order for information to be processed. In simple terms, information generally must be input into a computing system with a series of "on" and "off" states (e.g., binary code). However, humans live in a distinctly analog world where occurrences are never completely black or white, but always seem to be in between shades of gray. Thus, a central distinction between digital and analog is that digital requires discrete states that are disjunct over time (e.g., distinct levels) while analog is continuous over time. As humans naturally operate in an analog fashion, computing technology has evolved to alleviate difficulties associated with interfacing humans to computers (e.g., digital computing interfaces) caused by the aforementioned temporal distinctions.

A set of structured keys is one of the earliest human-machine interface devices, traditionally utilized in a typewriter. This interface system was adapted to interact, not with mechanical keys and paper, but to trigger discrete states that would be transmitted to a computing system. Thus, a computer "keyboard" was developed, allowing humans to utilize an existing, familiar interface with unfamiliar technology. This eased the transition into the computer age. Unfortunately, not everyone who wanted to utilize a computer knew how to type. This limited the number of computer users who could adequately utilize the computing technology. One solution was to introduce a graphical user interface that allowed a user to select pictures from a computing monitor to make the computer do a task. Thus, control of the computing system was typically achieved with a pointing and selecting device known as a "mouse." This permitted a greater number of people to utilize computing technology without having to learn to use a keyboard. Although these types of devices made employing computing technology easier, it still did not address the age old methods of communicating—handwriting and drawing.

Technology first focused on attempting to input existing typewritten or typeset information into computers. Scanners or optical imagers were used, at first, to "digitize" pictures (e.g., input images into a computing system). Once images could be digitized into a computing system, it followed that printed or typeset material should be able to be digitized also. However, an image of a scanned page cannot be manipulated as text or symbols after it is brought into a computing system because it is not "recognized" by the system, i.e., the system does not understand the page. The characters and words are "pictures" and not actually editable text or symbols. To overcome this limitation for text, optical character recognition (OCR) technology was developed to utilize scanning technology to digitize text as an editable page. This technology worked reasonably well if a particular text font was utilized that allowed the OCR software to translate a scanned image into editable text. At first, this technology had an accuracy of about 50 to 60%, but today it has progressed to an accuracy of near 98 to 99% or higher. OCR technology has even evolved to the point where it can take into account not only recognizing a text character, but also retaining paragraph and page formatting and even font characteristics.

Subsequently, OCR technology reached an accuracy level where it seemed practical to attempt to utilize it to recognize handwriting. After all, why transpose handwriting to text via a keyboard if it can be directly digitized into a computing system? The problem with this approach is that existing OCR technology was tuned to recognize limited or finite choices of possible types of fonts in a linear sequence (i.e., a line of text). Thus, it could "recognize" a character by comparing it to a database of pre-existing fonts. If a font was incoherent, the OCR technology would return strange or "non-existing" characters, indicating that it did not recognize the text. Handwriting proved to be an even more extreme case of this problem. When a person writes, their own particular style shows through in their penmanship. Signatures are used, due to this uniqueness, in legal documents because they distinguish a person from everyone else. Thus, by its very nature, handwriting has infinite forms even for the same character. Obviously, storing every conceivable form of handwriting for a particular character would prove impossible. Other means needed to be achieved to make handwriting recognition a reality.

One of the earlier attempts at handwriting recognition involved "handwriting" that was actually not handwriting at all. A system of "strokes" or lines was utilized as input into a computing system via a "tablet" or writing surface that could be digitized and translated into the system. Although attempts were made to make the strokes very symbolic of a printed text letter, the computing system was not actually recognizing handwriting. In fact, this method actually forces humans to adapt to a machine or system being used. Further developments were made to actually recognize true handwriting. Again, if a system was required to match every conceivable variation of a letter to one in a given database, it would take enormous processing resources and time. Therefore, some of the first advances were made in areas that had at least a finite, even though rather large, group of possibilities such as mail zip codes.

Technology has continued to develop to reach a point where a system can accurately and quickly interact with a user. This has led to an increased focus on systems that can adapt readily to a multitude of users. One way of achieving this type of system is to utilize a "classification" system. That is, instead of attempting to confine data to "right" or "wrong," allow it to fall within a particular "class" of a classification. An example of this would be a user whose handwriting varies slightly from day-to-day. Thus, a traditional system might not understand what was written. This is because the system is attempting to make a black and white assessment of the input data. However, with a classification based system, a negative response might only be given if the handwriting was so varied as to be illegible. A disadvantage of this type of system is that the classifiers must be manually trained in order to increase the accuracy of the classifier.

Despite the vast improvements of systems to recognize natural human inputs, they still require that a user follow some type of linear space and/or time sequencing in order to facilitate recognizing a user's input. In other words, a user must follow a line such as a line of text or must draw an equation in a particular time sequence. If a user decides to annotate or correct a drawing or an equation at a later point in time, these traditional types of systems can no longer accurately recognize the input. Because of these limitations, traditional systems also cannot handle situations where inputs are scaled and/or re-oriented. The systems tend to be complex as well and require great effort to improve their performance.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to recognition, and more particularly to systems and methods for grouping and recognizing text and/or graphics. Spatial relationships are leveraged to provide a systematic means to recognize text and/or graphics, providing simultaneous grouping and recognition of sketched symbols (alphabetical and/or graphical) by, for example, a computing entity. This allows augmentation of a handwritten shape with its symbolic meaning, enabling numerous features including smart editing, beautification, and interactive simulation of visual languages. The spatial recognition method obtains an optimization over a large space of possible groupings from the simultaneously grouped and recognized sketched shapes. The optimization utilizes a classifier that assigns a class label to a collection of strokes. Provided that the classifier can distinguish valid shapes, the overall grouping optimization assumes the properties of the classifier. For example, if the classifier is scale and rotation invariant, the results of the optimization will be as well. Instances of the present invention employ a variant of AdaBoost to facilitate in recognizing/classifying symbols. Instances of the present invention employ dynamic programming and/or A-star search to perform an efficient optimization. Thus, the present invention provides an integrated, accurate, and efficient method for recognizing and grouping sketched symbols. It applies to both hand-sketched shapes and printed handwritten text, and even heterogeneous mixtures of the two.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
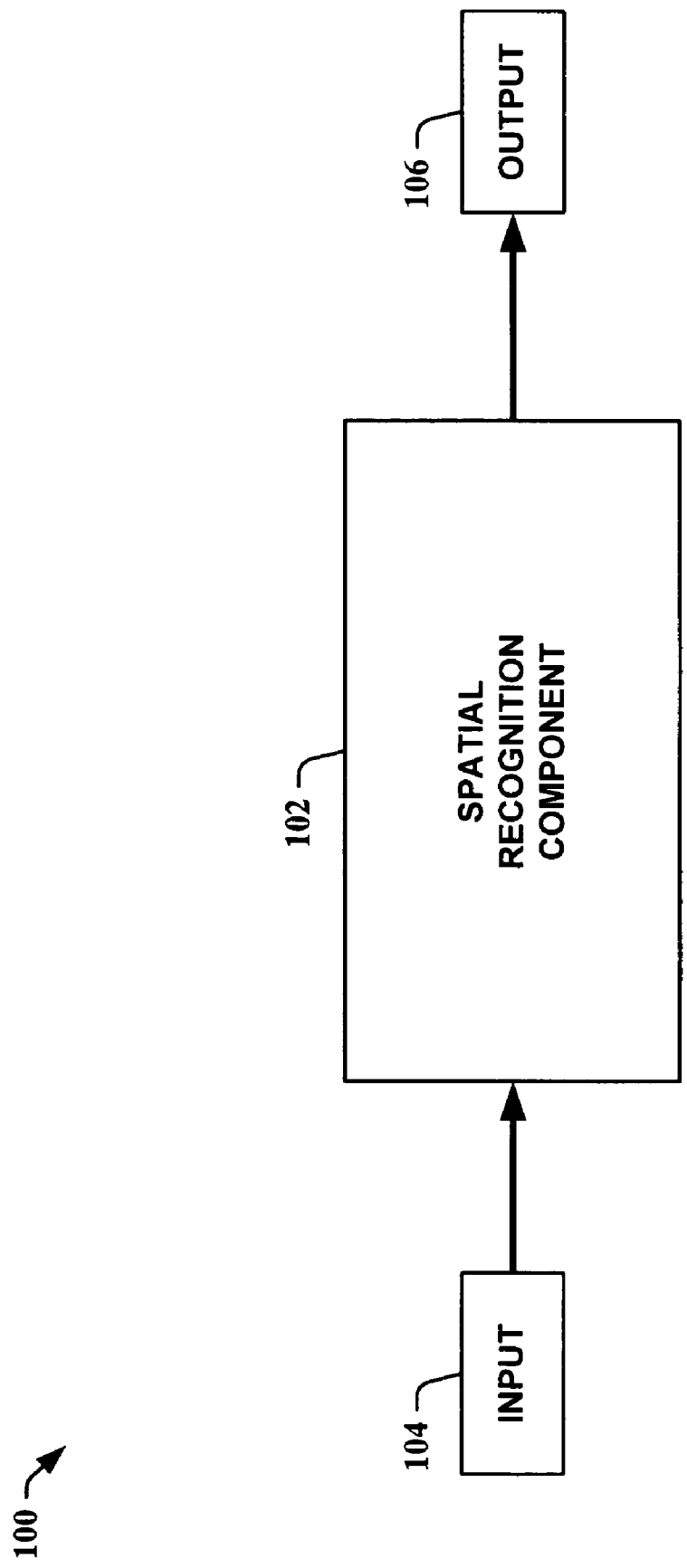
FIG. 1 is a block diagram of a spatial recognition system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides systems and methods for grouping and recognition of characters and symbols in on-line free-form ink expressions. The approach is completely spatial, that is it does not require any ordering on the strokes.

It also does not place any constraint on the relative placement of the shapes or symbols. Initially each of the strokes on the page is linked in a proximity graph. A discriminative classifier (i.e., "recognizer") is utilized to classify connected subgraphs as either making up one of the known symbols or perhaps as an invalid combination of strokes (e.g., including strokes from two different symbols). This classifier combines the rendered image of the strokes with stroke features such as curvature and endpoints. A small subset of very efficient image features is selected, yielding an extremely fast classifier. In one instance of the present invention, dynamic programming, over connected subsets of the proximity graph, is utilized to simultaneously find the optimal grouping and recognition of all the strokes on the page. This instance of the present invention can achieve 94% grouping/recognition accuracy on a test dataset containing symbols from 25 writers held out from the training process. In another instance of the present invention, an A-star search algorithm, over connected subsets of the proximity graph, is utilized to simultaneously find the optimal grouping and recognition of all the strokes on the page. This instance of the present invention can achieve 97% grouping/recognition accuracy on a cross-validated shape dataset from 19 different writers.

Sketched shape recognition is a classic problem in pen user interfaces. Augmenting a sketched shape with its symbolic meaning can enable numerous features including smart editing, beautification, and interactive simulation of visual languages [see generally, (Gross, M.; Stretch-A-Sketch, A Dynamic Diagrammer; *IEEE Symposium on Visual Languages* (VL '94); 1994), (Landay, J. and Myers, B.; Interactive Sketching for the Early Stages of User Interface Design; *Proc. of CHI '95: Human Factors in Computing Systems*; Denver, Colo.; May 1995, pp. 43-50), (Alvarado, C. and Davis, R; Preserving The Freedom Of Paper In A Computer-Based Sketch Tool; *Proceedings of HCI International;* 2001), and (Kara, L. and Stahovich, T; Sim-U-Sketch: A Sketch-Based Interface for Simulink; *AVI* 2004; pp 354-357)]. The present invention provides an integrated, accurate, and efficient method for recognizing and grouping sketched symbols. It applies to both hand-sketched shapes and printed handwritten text, and even heterogeneous mixtures of the two.

In FIG. 1, a block diagram of a spatial recognition system 100 in accordance with an aspect of the present invention is shown. The spatial recognition system 100 is comprised of a spatial recognition component 102 that receives an input 104 and provides an output 106. The spatial recognition component 102 simultaneously segments and recognizes entities found within the input 104. The recognized entity is then provided as the output 106. The spatial recognition component 102 utilizes spatial queues and features of entities such as stroke curvature, orientation, and endpoints to facilitate in the process. This allows the present invention to provide recognition without having linear restrictions as to time and space with regard to strokes found within the input. It is often impracticable to limit how a user must input information. Mistakes are often made and users tend to revisit their work and make changes at a later time or annotate changes above and below their work. Traditional systems cannot handle these types of changes. However, the present invention does not possess these limitations.

Figure 2:
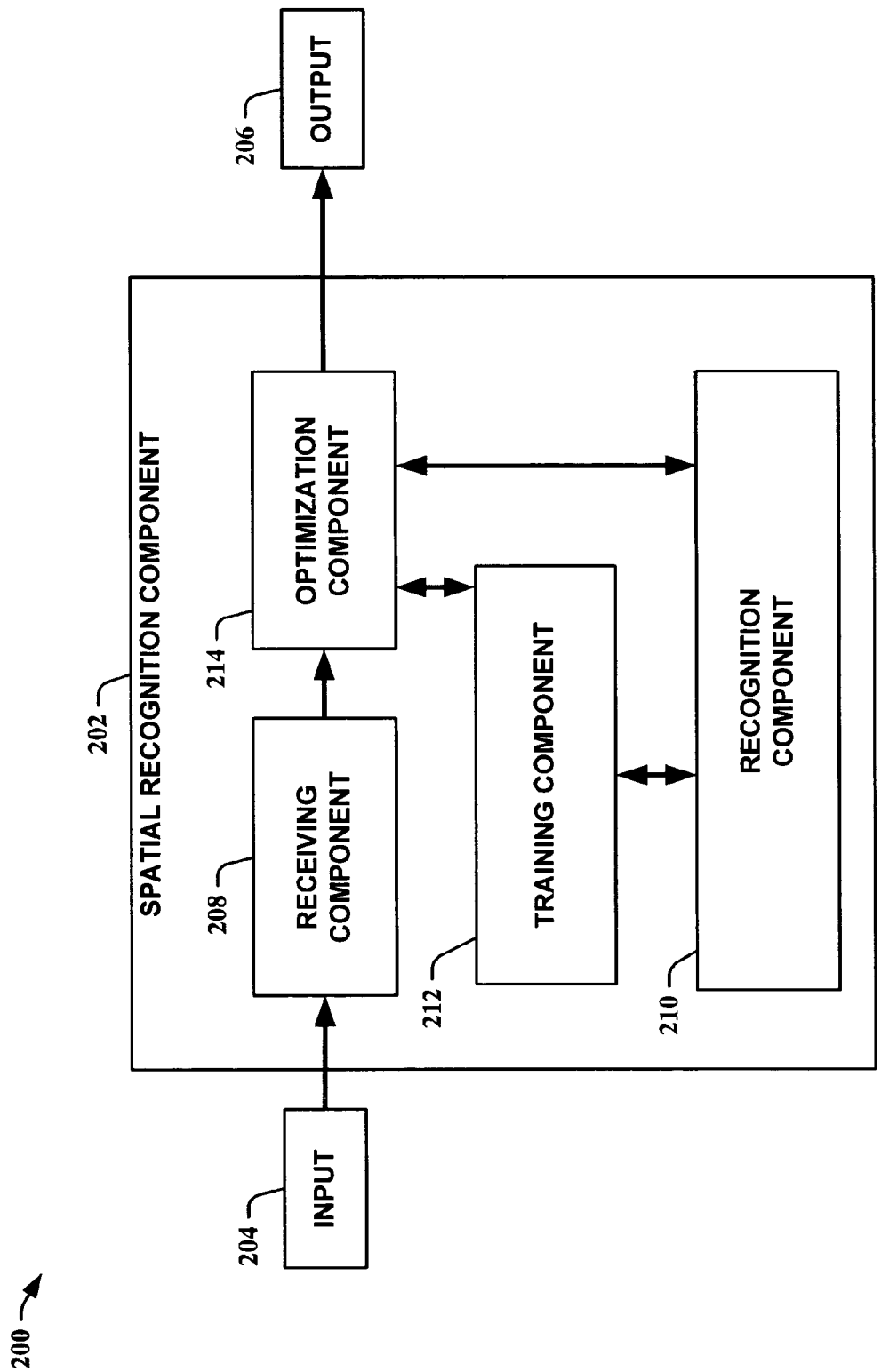
FIG. 2 is another block diagram of a spatial recognition system in accordance with an aspect of the present invention.

Referring to FIG. 2, another block diagram of a spatial recognition system 200 in accordance with an aspect of the present invention is depicted. The spatial recognition system 200 is comprised of a spatial recognition component 202 that receives an input 204 and produces an output 206. The spatial recognition component 202 is comprised of a receiving component 208, a recognition component 210, a training component 212, and an optimization component 214. The receiving component 208 interfaces with the input 204 and the optimization component 214. The optimization component 214 interfaces with the receiving component 208, the training component 212, and the recognition component 210. The training component 212 trains a classifier for a recognizer in the recognition component 210 to facilitate in recognizing entities within an input. The training component 210 automatically provides the training without the requirement for manually-entered parameters as found in traditional systems. The optimization component 214 breaks up strokes from an input into groups for recognition by the recognition component 210 and processes the results by optimization. When an input is available, the receiving component 208 receives the input 204 and sends it to the optimization component 214. The optimization component 214 processes the input 204 and interfaces with the recognition component 210 to classify any entities found in the input 204. The recognized entities are then provided in the output 206. One skilled in the art will appreciate that the various components 208-214 can be combined into a single recognition component and/or the various functionality can be distributed among the components 208-214 in a different fashion than that described supra.

Figure 3:
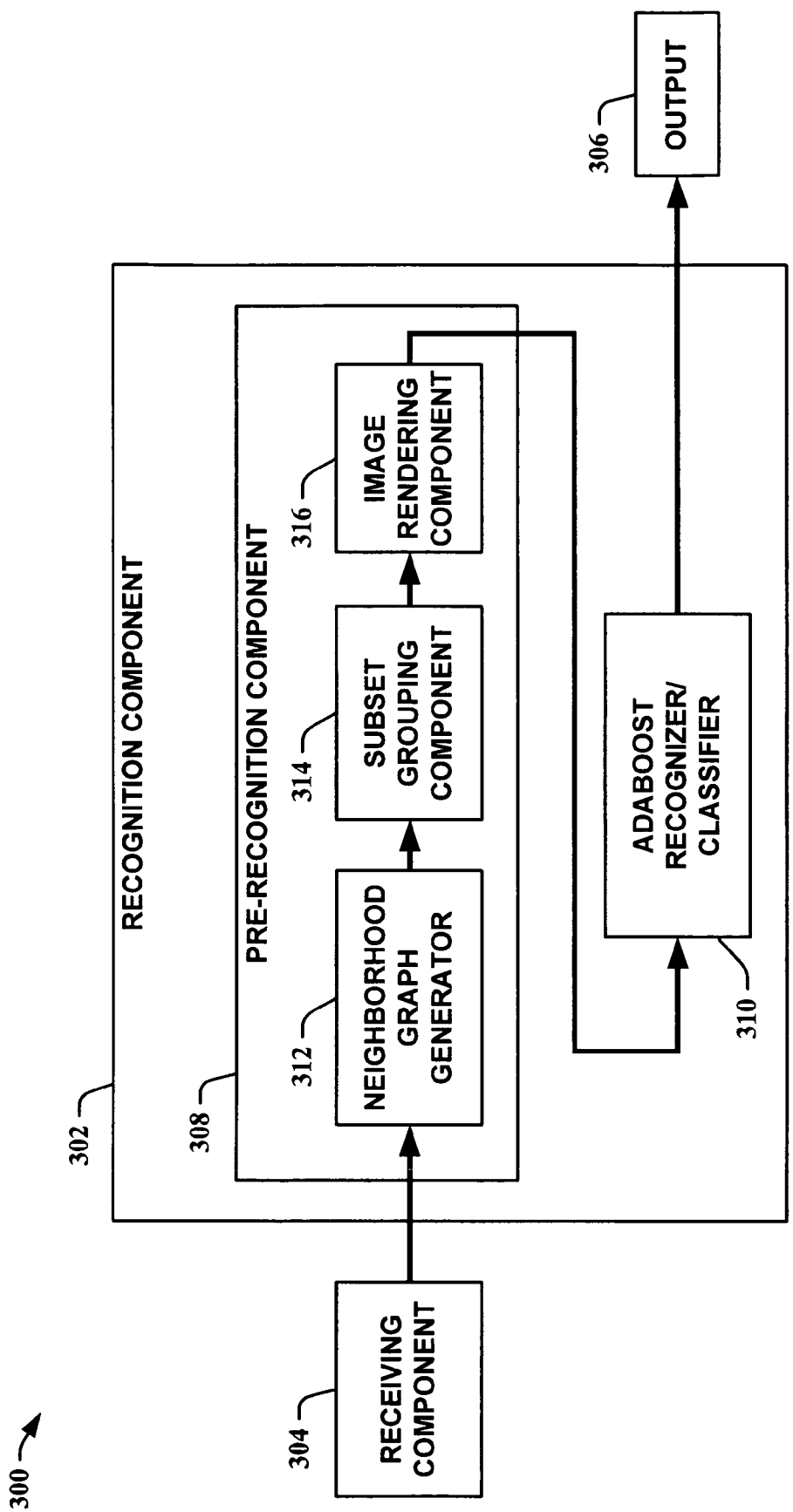
FIG. 3 is yet another block diagram of a spatial recognition system in accordance with an aspect of the present invention.

Turning to FIG. 3, yet another block diagram of a spatial recognition system 300 in accordance with an aspect of the present invention is illustrated. The spatial recognition system 300 is comprised of a recognition component 302 that interfaces with a receiving component 304 and provides an output 306. In this instance of the present invention, the recognition component 302 is comprised of a pre-recognition component 308 and an AdaBoost recognizer/classifier component 310. The pre-recognition component 308 is comprised of a neighborhood graph generator 312, a subset grouping component 314, and an image rendering component 316. The neighborhood graph generator 312 receives an input from the receiving component 304 and constructs a neighborhood/proximity graph of strokes found in the input. One skilled in the art will appreciate that other graph types can be employed by the present invention as well. This graph is then received by the subset grouping component 314. This component 314 segments the proximity graph into subsets/subgraphs based on criteria described in detail infra. The subset grouping component 314 then passes a subset to the image rendering component 316. It 316 then produces a rendered image of the subset that can be processed by the AdaBoost recognizer/classifier 310. The recognizer/classifier 310 then identifies the subset and provides the results in the output 306. This system of one instance of the present invention is simplified and does not describe the process for optimizing the subsets via cost functions and the like, nor details describing context information and feature information that is also provided to the AdaBoost recognizer/classifier. These details are described infra.

Figure 4:
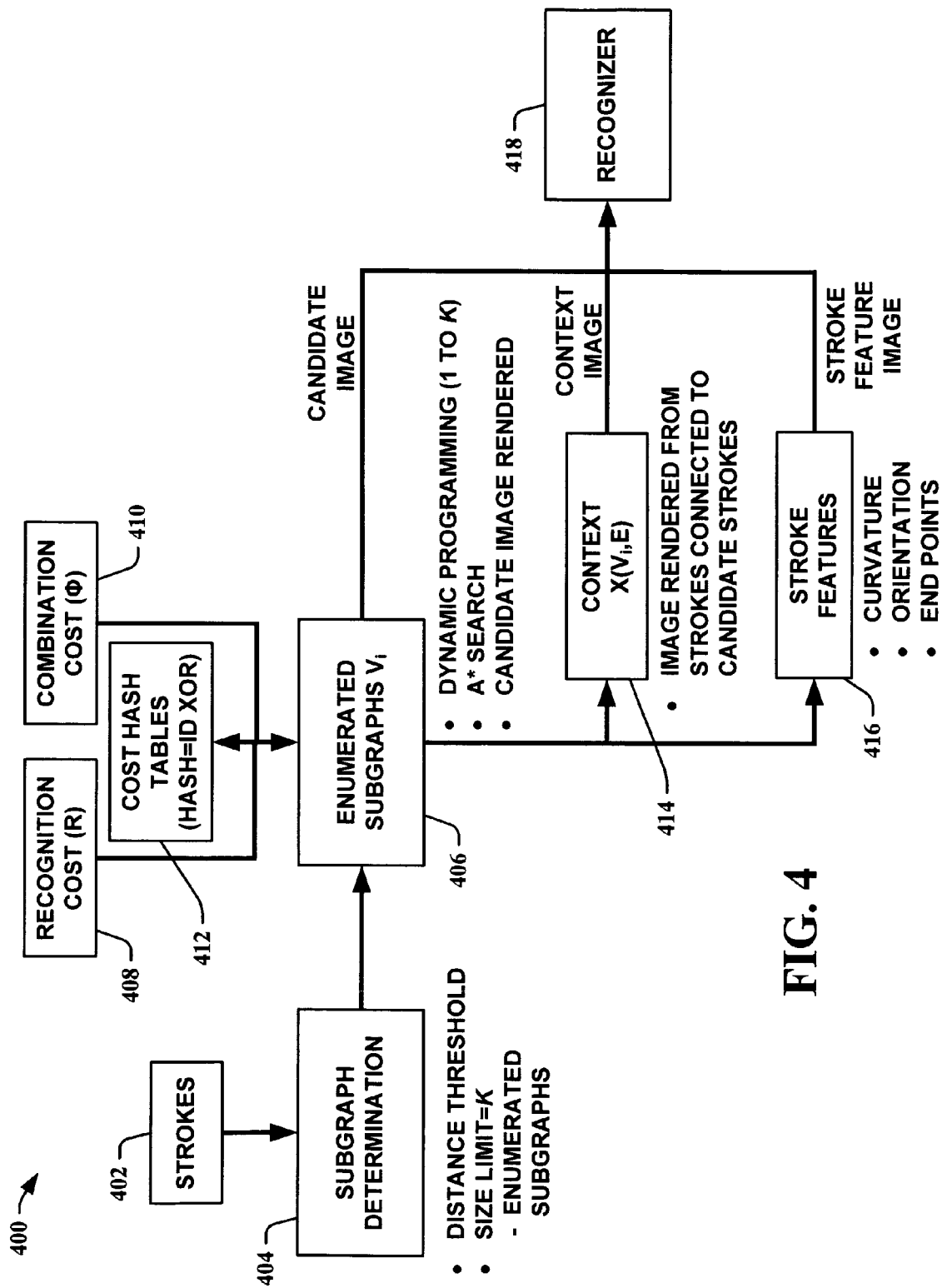
FIG. 4 is a block diagram of a spatial recognition system training process in accordance with an aspect of the present invention.

Moving on to FIG. 4, a block diagram of a spatial recognition system training process 400 in accordance with an aspect of the present invention is shown. FIG. 4 provides an information flow of the training process for an instance of the present invention. In this example, a subgraph determination 404 is performed on a set of strokes 402. The subgraph determination 404 includes constructing a proximity graph and segmenting the graph into subgraphs. Criteria such as a minimum distance between curvature of strokes being less than a distance threshold and the like are employed to facilitate in determining the proper subgraphs. A predetermined size limit, K, is utilized to limit the complexity of the subgraphs. The determined subgraphs are then enumerated. The enumerated subgraphs, $V_i$ 406, are then processed to determine an optimal decomposition. The optimal decomposition is a set of subgraphs whose union is the entire graph. The optimization can utilize such parameters as recognition cost 408 and combination cost 410. Additionally, dynamic programming can be employed to facilitate the processing by utilizing cost hash tables 412, increasing the efficiency of the processing. Dynamic processing can also be employed to eliminate invalid subgraphs by performing iterative processing from 1 to K. An A-star search can also be utilized to select an optimum subgraph. These optimization schemes are discussed in more detail infra. The optimum subgraph is then rendered to form a "candidate image" that is passed to a recognizer 418. The selection information is also processed to form a context 414 and stroke features 416. Strokes that are connected to strokes utilized in the candidate image are employed to form a "context image" that is sent to the recognizer 418. The stroke features of the candidate image, such as curvature, orientation, and end points and the like are utilized to form a "stroke feature image" which is also provided to the recognizer 418. Additional feature images can be constructed and sent to the recognizer as well. Thus, the recognizer receives, as inputs, a candidate image and also context and stroke feature images for that candidate image.

Figure 5:
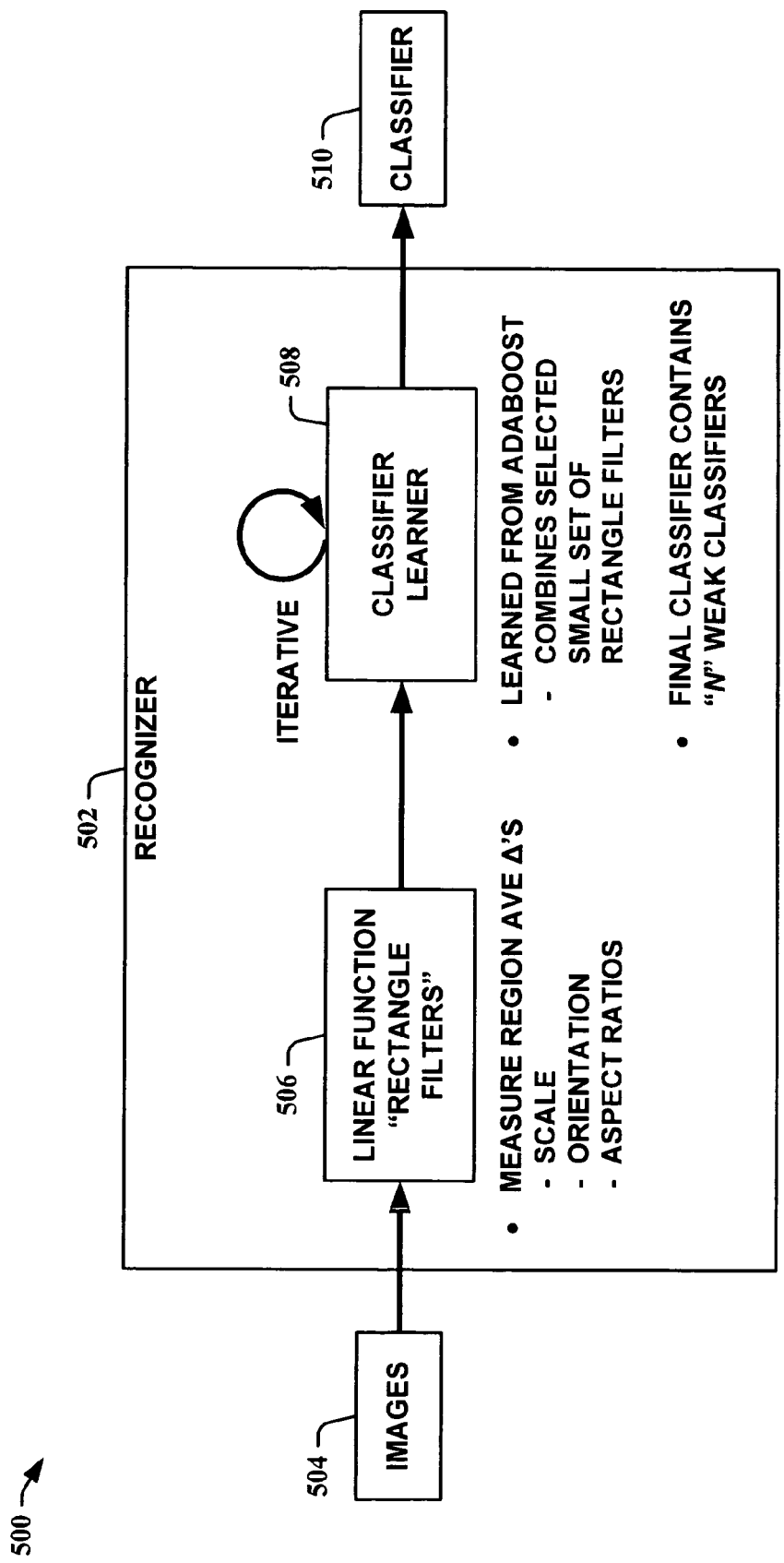
FIG. 5 is another block diagram of a spatial recognition system training process in accordance with an aspect of the present invention.

In FIG. 5, another block diagram of a spatial recognition system training process 500 in accordance with an aspect of the present invention is depicted. FIG. 5 illustrates a training process after the images described in FIG. 4 have been constructed. A recognizer 502 accepts images 504 and processes them to produce a learned classifier 510. The images 504 are employed to derive linear functions or "rectangle filters" that measure a region's average deltas for such items as scale, orientation, and aspect ratios. A classifier learner 508 then utilizes the rectangle filters to facilitate in learning a classifier. AdaBoost and a small set of rectangle filters are employed to learn the classifier. This process is iterative N times and produces N weak classifiers, each based on a set of rectangle filters. Thus, the final classifier 510 is based on weak classifiers produced from the context, stroke features, and candidate images. In other instances of the present invention, boosted decision trees are utilized with a depth from one to three.

The problem of recognizing sketched drawings can be divided into two parts: grouping strokes into sets and recognizing what symbol a set of stroke represents. Previous research has proposed numerous shape recognition strategies including a wide variety of different features and classifiers. Some strategies emphasize invariance to changes in scale and rotation (see, Hse, H. and Newton, A.; Sketched Symbol Recognition Using Zernike Moments; *International Conference on Pattern Recognition*; August 2004; Cambridge, UK). Others require few examples to train [see, (Rubine, D.; Specifying Gestures by Example; SIGGRAPH '91, 25 (4); 329-337), (Kara and Stahovich), (Veselova, O. and Davis, R; Perceptually Based Learning of Shape Descriptions for Sketch Recognition; *The Nineteenth National Conference on Artificial Intelligence* (AAAI-04); July 2004)]. Others are able to cope with dashed sketches and overstrikes (see, Fonseca, M. J., Pimentel, C., and Jorge, J. A.; CALI: An Online Scribble Recognizer for Calligraphic Interfaces; 2002 *AAAI Spring Symposium on Sketch Understanding*; Palo Alto Calif., 2002; AAAI Press, 51-58).

There are also many approaches to grouping ink strokes for recognition. Some systems are designed with the constraint that the user must draw shapes with a single stroke as in Rubine. Some systems utilize a timeout: when the user does not sketch for a pre-specified time, the system will group the last set of strokes into a shape to be recognized. Some systems utilize hand-tuned heuristics to group shapes as in Kara and Stahovich. Many handwriting systems require the users to finish writing one shape before beginning on the next one, and then perform an optimization over the sequence of strokes to find the grouping that maximizes some heuristic or statistical score (see, Tappert, C., Suen, C., and Wakahara, T.; The State of the Art in Online Handwriting Recognition; *IEEE Transactions on Pattern Analysis and Machine Intelligence*; 12(8): 787-808 (1990)).

In prior work, Mahoney and Fromherz (Mahoney, J. and Fromherz, M.; Interpreting Sloppy Stick Figures by Graph Rectification and Constraint-based Matching; *Fourth IAPR Int. Workshop on Graphics Recognition*; Kingston, Ontario, Canada; September 2001) have constructed a system that uses subgraphs of strokes that satisfy heuristically-specified constraints. They suggest that their approach should work well for sketches that are defined by the structural relationships between strokes, but may not be well-suited for sketches that are defined by the curve shape of the strokes.

In these traditional systems the user writes words in a structured fashion, either along a line or in an "input region." The recognition system then processes the entire line of text to recognize a group of strokes. When freed from the rigid "input region" requirement, users frequently generate free form handwritten notes which include handwritten text, diagrams, and annotation. These notes require significant initial processing in order to group the strokes into "lines" of text which can then be passed to the recognizer (see, for example, Shilman, M., Wei, Z., Raghupathy, S., Simard, P., and Jones, D.; Discerning Structure from Freeform Handwritten Notes; ICDAR 2003: 60-65). The grouping process is inherently difficult, and the best performance is achieved for simple paragraph structures in which there are a number of longer lines physically separated from drawing and annotations. The complexity of connected cursive recognition favors the two step process in which grouping precedes recognition.

Figure 6:
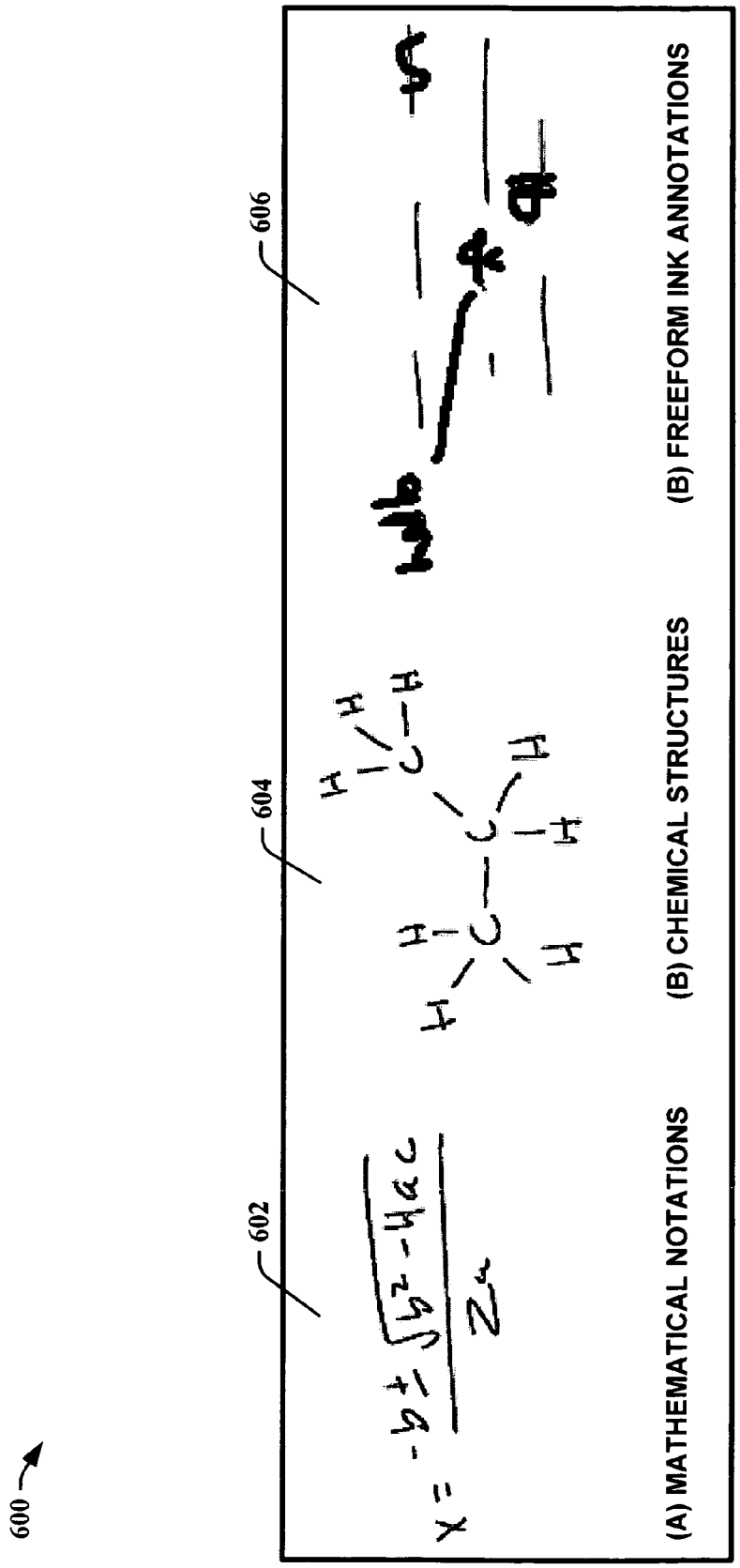
FIG. 6 is an illustration of stroke input examples in accordance with an aspect of the present invention.

There are, however, a number of ink recognition problems which provide few constraints on the high-level layout of the page. One example is mathematical equation recognition, which incorporates many types of geometric layouts and symbols. Other examples include chemical structures, editing marks, musical notes, and so on. These scenarios are particularly important to pen computing because they exploit the flexibility of a pen to quickly express spatial arrangements, which is something that is currently difficult utilizing a mouse and keyboard alone. FIG. 6 illustrates 600 that a pen is a particularly useful input device when layout is unconstrained, as is the case in (a) mathematics 602, (b) chemistry 604, and (c) document annotations 606.

Therefore, take, for instance, the problem of a system that performs integrated grouping and recognition of symbols over a page of handwritten ink. The system should not constrain writing order, because it is common to add extra strokes to correct characters after the fact. It should not make strict assumptions about the layout of the page. It should also scale to large pages of ink such as freeform notes, which can contain thousands of strokes in some cases.

Layout and timing-insensitive character recognition and grouping is not an easy problem. Symbol recognition is a well-known problem, for which many methods have been proposed (see, Chhabra, A.; Graphic Symbol Recognition: An Overview; In *Proceedings of Second International Workshop on Graphics Recognition*; Nancy (France); pages 244-252; August 1997). The handwriting recognition community has developed countless techniques for optimizing grouping and recognition over a fixed spatial or temporal order and for recognizing isolated characters [see, (Plamondon, R., and Srihari, S.; On-Line and Off-Line Handwriting Recognition: A Comprehensive Survey; *IEEE Transactions on Pattern Analysis and Machine Intelligence;* 22(1): 63-84; 2000) and (Tappert, Suen, and Wakahara)]. Other systems include those that deal with the processing of mathematical expressions [see, (Blostein, D. and Grbavec, A.; Recognition of Mathematical Notation; In *Handbook of Character Recognition and Document Image Analysis*; Eds. H. Bunke and P. Wang; World Scientific; 1997; pp. 557-582), (Chan, K. and Yeung, D.; Mathematical Expression Recognition: A Survey; *Int'l J. Document Analysis and Recognition*; vol. 3, no. 1, pp. 3-15; August 2000), (Matsakis, N.; Recognition of Handwritten Mathematical Expressions; Massachusetts Institute of Technology; Cambridge, Mass.; May 1999), (Miller, E. G. and Viola, P. A.; Ambiguity and Constraint in Mathematical Expression Recognition; *Proc. 15th Nat'l Conf. Artificial Intelligence*; pp. 784-791; 1998), and (Smithies, S., Novins, K., and Arvo, J.; A Handwriting-Based Equation Editor; *Graphics Interface '99*; June 1999)]. However, unlike these systems, a solution is desired that solves the problem in a way that does not require time ordering of strokes, does not require a linear organization of strokes on the page, and deals in a principled fashion with symbols that contain multiple strokes, some of which can be interpreted in isolation as another symbol.

Figure 7:
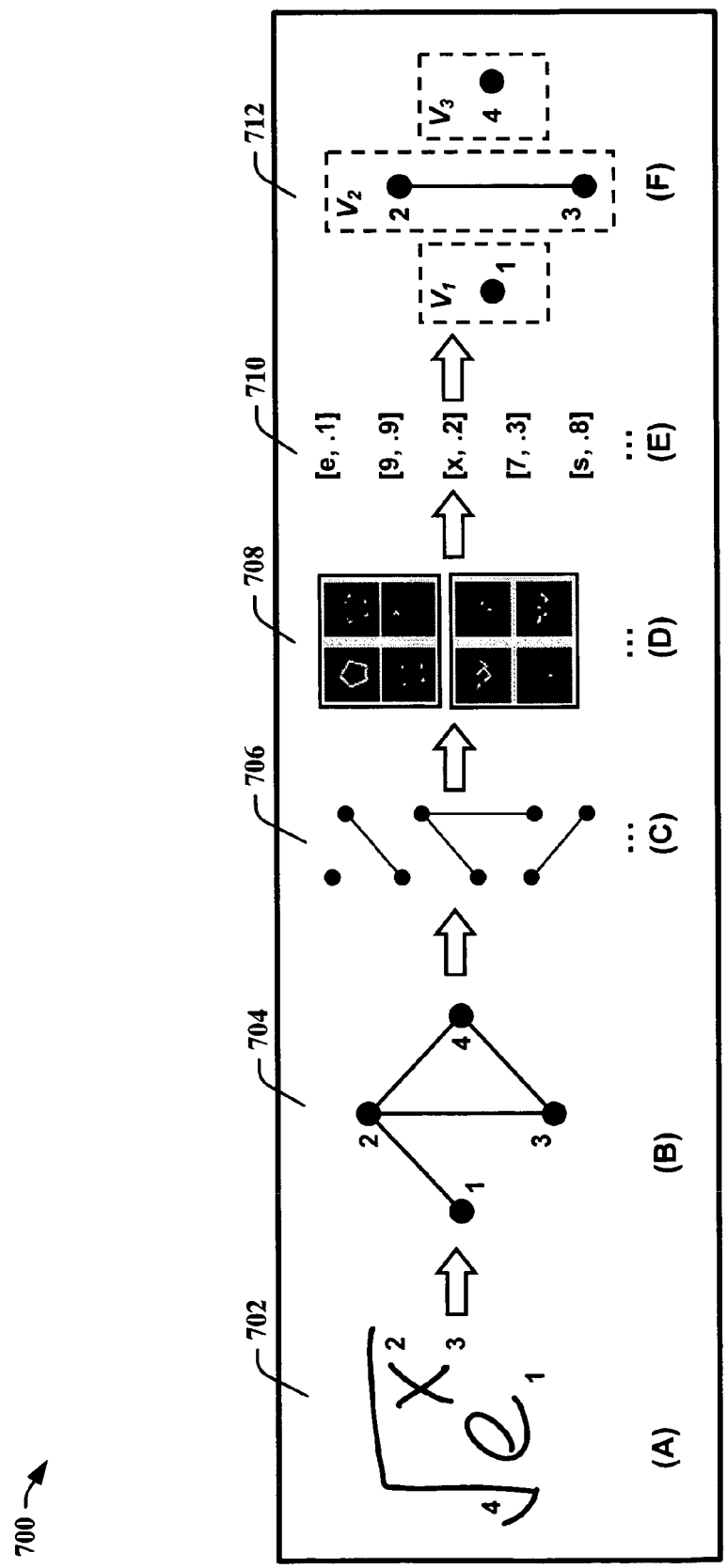
FIG. 7 is an illustration of an overview of a recognition process in accordance with an aspect of the present invention.
Figure 8:
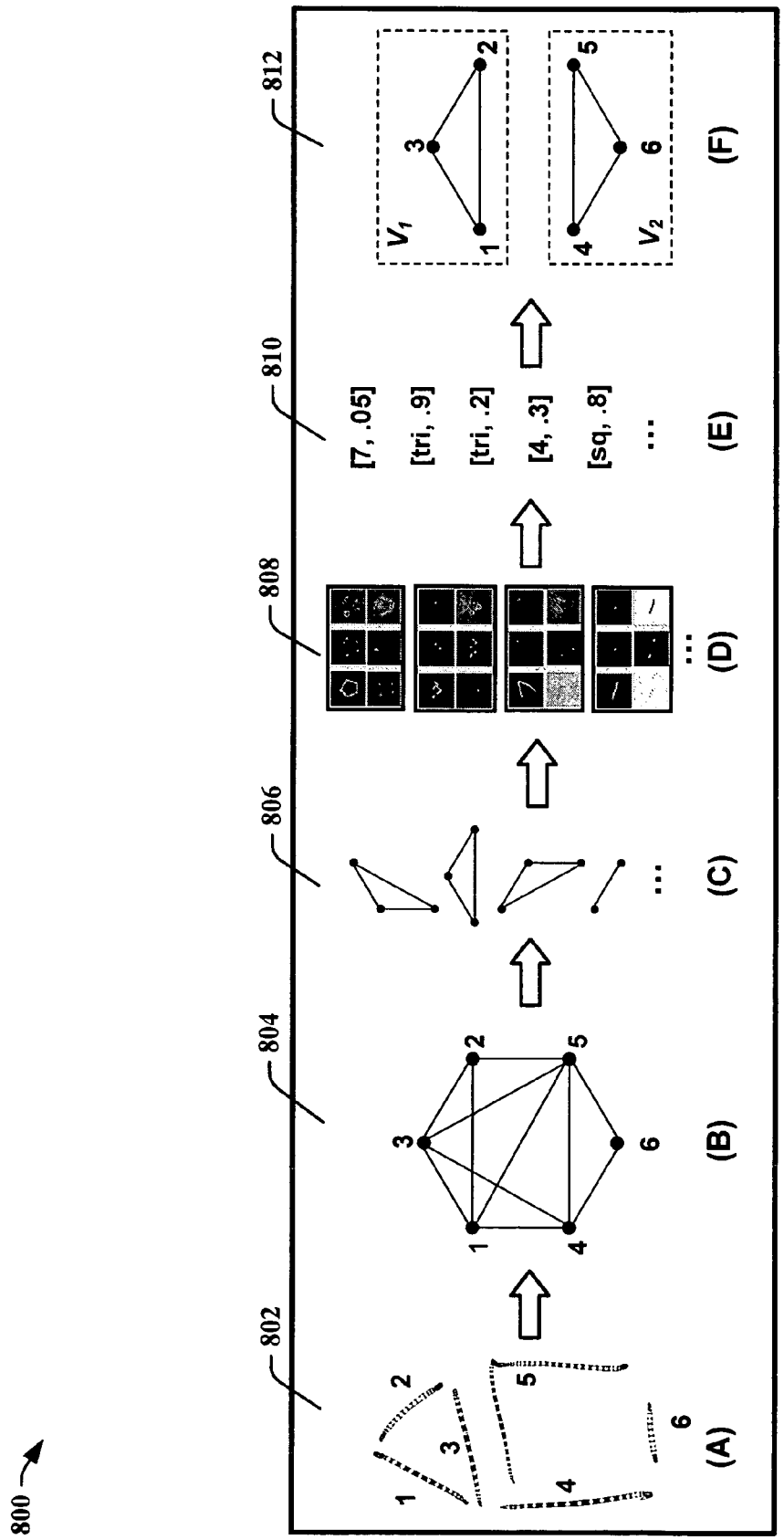
FIG. 8 is another illustration of an overview of a recognition process in accordance with an aspect of the present invention.

Thus, the present invention provides an efficient, purely spatial approach to simultaneously group and recognize handwritten symbols on a page and/or pixelized inputs. The present invention is an optimization over a large space of possible groupings in which each grouping is evaluated by a recognizer. This is in contrast to approaches where grouping and recognition are carried out as separate steps (e.g., systems with a separate layout analysis step). FIG. 7 illustrates an overview 700 of one instance of the present invention—(a) a user sketch containing several strokes 702, (b) a neighborhood graph of the strokes in the sketch 704, (c) connected subsets of the neighborhood graph of up to a fixed size K 706, (d) rendered images of the subsets are passed to an AdaBoost recognizer 708, (e) results from the recognizer include a symbol hypothesis and a score 710, and (f) an optimization partitions the graph to jointly maximize the recognizer scores 712. FIG. 8 illustrates another overview 800 of another instance of the present invention—(a) a user sketch containing several strokes 802, (b) a neighborhood graph of the strokes in the sketch 804, (c) connected subsets of the neighborhood graph of up to a fixed size K 806, (d) rendered images of the subsets that are passed to an AdaBoost classifier 808, (e) results from the classifier include a symbol hypothesis and a score 810, and (f) an optimization partitions the graph to jointly maximize the classifier scores 812.

In the present invention, the recognizer carries the burden of distinguishing good groupings from bad groupings and also assigns correct labels to good groupings. This sort of recognizer should evaluate quickly in order to process the large number of possible stroke groupings for a page of ink in a reasonable time. Given such a recognizer, there are several benefits to this factoring of the problem. Improving the accuracy or performance of the system is simply a function of improving the accuracy or performance of the recognizer. Introducing new features to the system, such as rotation- or scale-invariance is simply a matter of changing the recognizer, rather than changing both the recognizer and the layout analysis. Perhaps most significantly, it enables the present invention to be nearly entirely learned from examples rather than relying on hand-coded heuristics. Thus, the present invention is a monolithic system which, once developed, requires no hand constructed geometric features. All thresholds and parameters are learned automatically from a training set of examples.

The present invention operates in the following manner. As a preprocessing step, it first builds a neighborhood graph of the ink in which nodes correspond to strokes, and edges are added when strokes are in close proximity to one another. Given this graph, the present invention iterates efficiently over connected sets of nodes in the graph utilizing dynamic programming and fast hashing on collections of nodes. For each set of nodes of up to size K, a discriminative recognition is performed on the set. This allows incorporation of non-local information that facilitates in ruling out spurious answers that might result from a generative model. Dynamic programming is utilized to optimize over the space of possible explanations. The resulting system achieves high accuracy rates without any language model, places no stroke ordering requirements on the user, and places no constraints on the way in which symbols must be laid out on the page.

Shape recognition and grouping is approached as an optimization problem in the present invention. In other words, in the space of all possible groupings of strokes on the page all possible labelings of those groupings, there is a best grouping and labeling according to a cost function. Given a page of ink, it is desirable to minimize its global cost. The cost of a grouping and labeling is a function of the costs of each of its constituents:

$$C(\{V_i\}) = \Phi(R(V_1), R(V_2), \ldots, R(V_n)) \qquad \text{(Eq. 1)}$$

In Equation 1, each $V_i$ is a subset of the vertices which form a partition of the page (the terms strokes and vertices are utilized interchangeably), R is the best recognition result for that set of vertices, the function $\Phi$ is a combination cost (such as sum, max, or average), and C represents the overall cost of a particular grouping $\{V_i\}$. To implement this optimization efficiently, it is desirable to have a way to iterate over valid sets $V_i$ (graph iteration), an efficient and accurate symbol recognizer R (recognition cost), a cost function to combine the cost of two subgraphs $\Phi$ (combination cost), and a way to reuse computation (dynamic programming).

Of course, the number of possible groupings is combinatorial in the number of vertices, so it would be prohibitively expensive to compute all of the combinations. Therefore, the possible groupings are constrained in the following ways:

1. A neighborhood graph is constructed (FIG. 7(*b*) 704 and FIG. 8(*b*) 804) in which vertices that are close to each other on the page are connected. A grouping $V_i$ is only valid if its vertices are connected in the neighborhood graph.
2. The size of each subset $V_i$ in the graph is restricted to be less than a constant K (FIG. 7(*c*) 706 and FIG. 8(*c*) 806). For example, it is typical to not see symbols of greater than 8 strokes in data, so it is asserted that this it is reasonable to place an upper bound on the size of a subset.

Given these restrictions, two optimization methods have been utilized to solve for the best solution. The first optimization method employs dynamic programming, and the second optimization method further utilizes an improvement based on "A-star search."

In order to constrain the set of possible groupings, a grouping is only valid if the strokes in that grouping are in close proximity to one another. Thus, from a page of ink, a neighborhood graph G=(V, E) is constructed in which the vertices V correspond to strokes and edges E correspond to neighbor relationships between strokes, as shown in FIG. 7(*b*) 704.

In one instance of the present invention, vertices are neighbors if the minimum distance between the convex hulls of their strokes is less than a threshold. However, any reasonable proximity measure is expected to generate similar recognition results as long as the neighborhood graph contains edges between strokes in the same symbol. For example, a geometric relationship can include, but is not limited to, nearest neighbors and occluded neighbors and the like. Given this neighborhood graph, all connected subsets of the nodes $V_i$ in V where $|V_i| \leq K$ are enumerated. Each subset $V_i$ becomes a symbol candidate for the recognizer.

In general, there is no efficient way to enumerate subsets of up to size K without duplicating subsets. The present invention iterates by first enumerating all subsets of size "one." Each subset is then expanded by all of the edges on its horizon, eliminating duplicates, expanding again, and so on, up through size K. This eliminates the propagation of duplicates through each round. The subsets $V_i$ that are generated for the graph in FIG. 7(b) 704 are {1}, {2}, {3}, {4}, {1, 2}, {2, 3}, {2, 4}, {3, 4}, {1, 2, 3}, {1, 2, 4}, {2, 3, 4}, {1, 2, 3, 4}.

Figure 9:
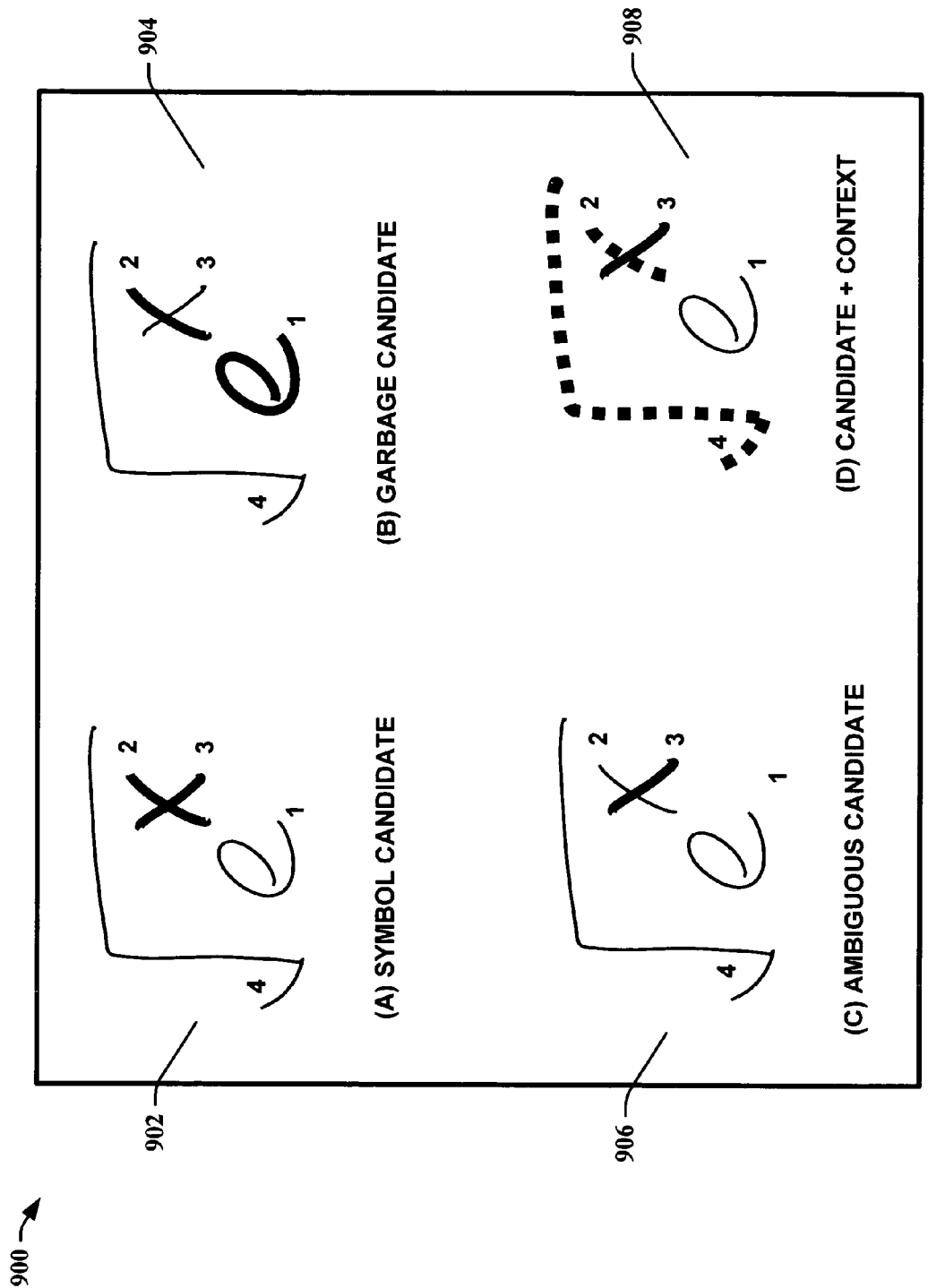
FIG. 9 is an illustration of a set of inputs for a recognizer in accordance with an aspect of the present invention.

In FIG. 9, a set of inputs 900 to a recognizer is shown—(a) a full symbol (in bold) that is passed as a candidate to the recognizer 902, (b) overgrouped "garbage" (in bold, defined infra) that is passed as a candidate to the recognizer 904, (c) garbage that is ambiguous with a back-slash (in bold) when passed to the recognizer without context 906, and (d) neighborhood context (dashed lines) that makes the stroke (in bold) in (c) unambiguously garbage 908. The second implementation detail of the optimization process is the recognition cost R, discussed in detail infra. The simple requirements are that R should return relatively low costs for subsets of the graph $V_i$ that correspond to symbols (such as in FIG. 9(a) 902). Similarly, R should return relatively high costs for subsets of the graph that do not correspond to symbols (such as in FIG. 9(b) 904, (c) 906, and (d) 908).

Typically, this is very difficult to achieve. Many of the subsets that are passed to the recognizer are invalid, either containing strokes from multiple characters or do not contain all the strokes of a multi-stroke symbol. Such subgraphs are called "garbage." While some of the garbage doesn't look like any symbol in the training set, some invalid examples are indistinguishable from training samples without the utilization of context. For example a single stroke of an X can be easily interpreted in isolation as a back-slash (FIG. 9(c) 906). Therefore, the present invention also passes the context $X(V_i, E)$ into the recognizer to help it identify garbage. The context is defined to be the set of nodes in $V-V_i$ that are connected to $V_i$ in E, and show an example in FIG. 9(d) 908.

The third implementation detail of the optimization is the combination cost, $\Phi(c_1, c_2)$. The combination cost is a function of the costs of the two subsets of the graph. Several alternative costs are considered:

Sum: $\Phi(c_1, c_2) = c_1 + c_2 \epsilon$. The sum of the costs makes intuitive sense: if the costs are negative log likelihoods then the sum corresponds to a product of probabilities. The $\epsilon$ penalty can be used to control over/under grouping (higher values of $\epsilon$ force grouping into fewer symbols).

Max: $\Phi(c_1, c_2) = Max(c_1, c_2)$. This function penalizes the worst hypothesis in the set.

Average: $\Phi(c_1, c_2) = (c_1 + \omega c_2)/(1+\omega)$. This function averages the scores across all of the symbols in the hypothesis. $\omega$ is a weight corresponding to the number of symbols in the best interpretation for $V-V_i$.

Finally, because the function that the present invention optimizes cleanly partitions the graph into a combination of $R(V_i)$ and $C(V-V_i)$, dynamic programming can be utilized to avoid redundant computation. In other words, if C has already been computed for a subset of strokes in the neighborhood graph, the result can be reused by looking it up in a hash table. The present invention hashes on sets of strokes by XOR'ing stroke ID's. The recognizer/classifier utilized in the dynamic programming system described above is based on a novel application of AdaBoost (see, Freund, Y. and Schapire, R.; Experiments with a New Boosting Algorithm; ICML 1996: 148-156).

The basic framework utilized is most closely related to the work of Viola and Jones (see, Viola, P. and Jones, M.; Robust Real-Time Face Detection. ICCV 2001: 747), who constructed a real-time face detection system utilizing a boosted collection of simple and efficient features. This approach is selected both because of its speed and because it is extensible to include additional feature information. The Viola-Jones technique has been generalized by the present invention in two ways. First, the classification problem is multi-class. Second, additional input features have been added to the image map. These additional features are computed directly from the on-line stroke information and include curvature, orientation, and end-point information. Although this information can be computed directly from the image, this information is currently only available from on-line systems.

The input to the recognition system is a collection of images. The two principle images are the candidate image and the context image. The current candidate sub-graph is rendered into an image which is 29×29 pixels. The geometry of the strokes is normalized so that they fit within the central 18×18 pixel region of the image. Strokes are rendered in black on white with anti-aliasing. The context image is rendered from the strokes which are connected to a candidate stroke in the proximity graph.

Each of the principle images are augmented with additional stroke feature images. This is much like the earlier work on AMAP (see, Bengio, Y. and LeCun, Y., Word Normalization for On-line Handwritten Word Recognition; In *Proc. of the International Conference on Pattern Recognition*; IAPR, ed.; Jerusalem; pp. 409-413; October 1994). The first additional image records the curvature at each point along each stroke. The angle between the tangents is a signed quantity that depends on the direction of the stroke, which is undesirable. The absolute value of this angle provides direction invariant curvature information.

Two additional feature images measure orientation of the stroke. Orientation is a difficult issue in image processing, since it is naturally embedded on a circle (and hence $2\pi$ is identical to 0). Orientation has been chosen to be represented in terms of the normal vector (perpendicular vector) to the stroke (which is measured from the same nearby points used to measure curvature). The two components of the normal are represented as two images the normalX image, and the normalY image (by convention the normal has a positive dot product with the previous tangent).

Figure 10:
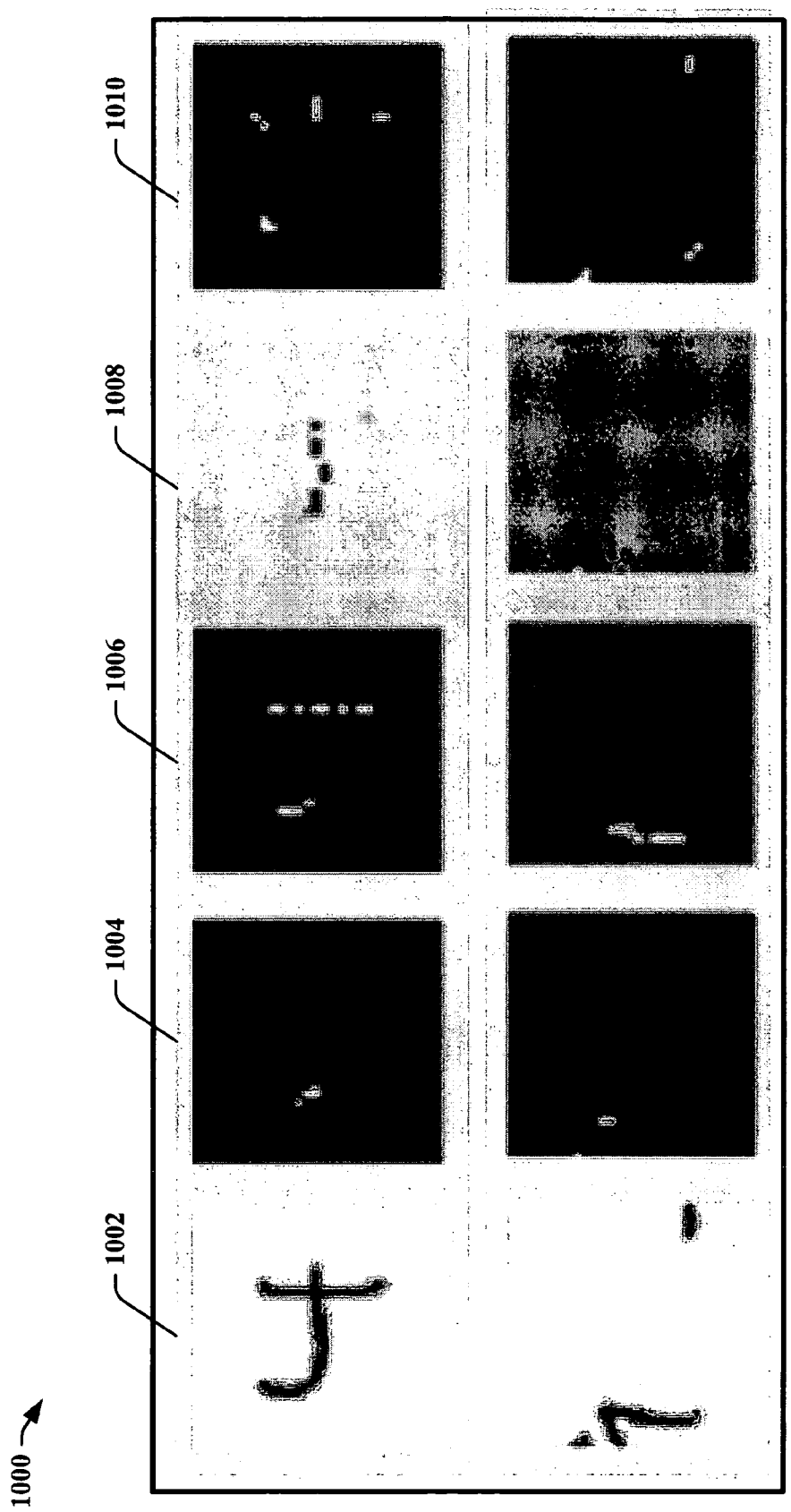
FIG. 10 is an illustration of a recognition process in accordance with an aspect of the present invention.

The final additional feature image contains only the end-points of the strokes, rather than the entire stroke. This measure can be useful in distinguishing two characters which have much ink in common, but have a different start and end point, or a different number of strokes (for example '8' and '3'). FIG. 10 illustrates this process 1000. The left most images 1002 in each row are the candidate and context images rendered at 29×29 pixels. The remainder of each row shows various feature images computed from these principle images. From left to right: stroke curvature 1004, stroke normalX 1006, stroke normalY 1008, and endpoints 1010.

Figure 11:
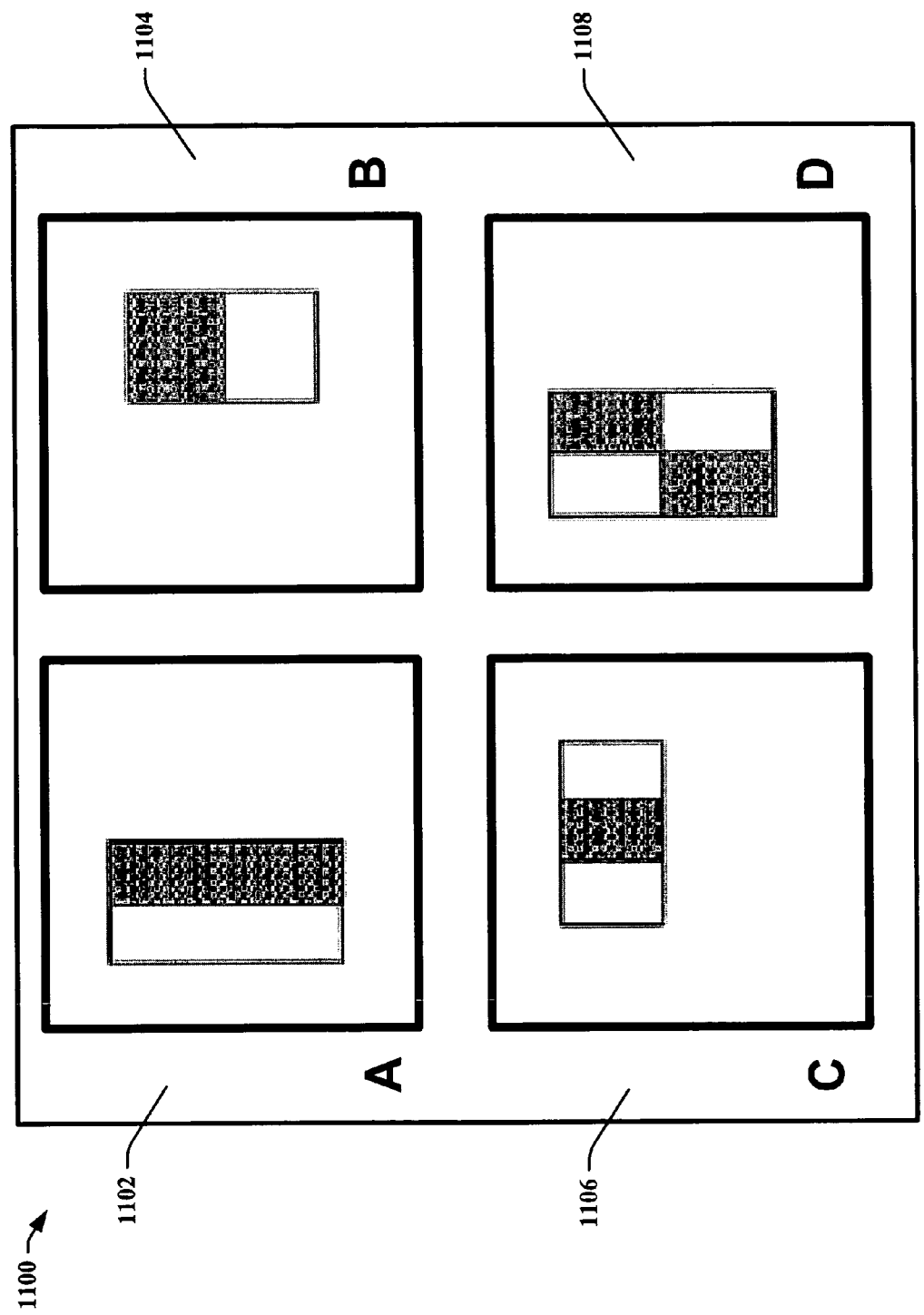
FIG. 11 is an illustration of a rectangle filter technique in accordance with an aspect of the present invention.

A very large set of simple linear functions are computed from the input images defined above. The form of these linear functions was proposed by Viola and Jones, who call them "rectangle filters." Each can be evaluated extremely rapidly at any scale. In FIG. 11, example rectangle filters 1100 are shown relative to the enclosing classification window. The sum of the pixels which lie within the white rectangles are subtracted from the sum of pixels in the grey rectangles. Rectangle filters which contain two rectangles are shown in (A) 1102 and (B) 1104. The filters measure the differences between region averages at various scales, orientations, and aspect ratios. The rigid form of these features arises from the fact that each can be computed extremely rapidly, in 6 or fewer add/multiplies.

For example, a set of one and two rectangle filters can be constructed combinatorially. A set of filters of varying size, aspect ratio, and location are then generated. The set is not exhaustive and an effort is made to minimize overlap between the filters, resulting in 5280 filters. Such a large set is clearly overcomplete in that it requires only 841 linear filters to reconstruct the original 29 by 29 image. Nevertheless this overcomplete basis is very useful for learning. Each filter can be evaluated for each of the 10 feature images, yielding a set of 52,800 filter values for each training example. Utilizing a critical subset selection process improves performance.

The above describes a processing pipeline for training data: a rendering process for candidate and context, a set of additional feature images, and a set of rectangle filters. However, the machine learning problem is to generate a classifier for this data which correctly determines the correct symbol of the candidate strokes, or possibly that the set of strokes is garbage. Therefore, AdaBoost is employed to learn a classifier which selects a small set of rectangle filters and combines them. One skilled in the art will appreciate that other machine learning techniques can be employed by the present invention such as, for example, Neural Networks, Support Vector Machines, and Bayesian Classification and the like.

Assume that a "weak learner" is a classifier which computes a single rectangle filter and applies a threshold (this is a type of decision tree known as a decision stump). In each round of boosting the single best stump is selected, and then the examples are re-weighted. The multi-class variant of confidence rated boosting algorithm proposed by Schapire and Singer (see, Schapire, R. and Singer, Y.; Improved Boosting Algorithms Using Confidence-Rated Predictions; *COLT* 1998: 80-91) is utilized.

After N rounds, the final classifier contains N weak classifiers. Since each weak classifier depends on a single rectangle filter only N filters need to be evaluated. Excellent performance is achieved with between approximately 75 and 200 filters. On a training set of 3800 examples from 25 writers, 0 training errors was observed with 165 weak classifiers. On a test set of 3800 examples from a different set of 25 writers, 96% of the characters were classified correctly.

Figure 12:
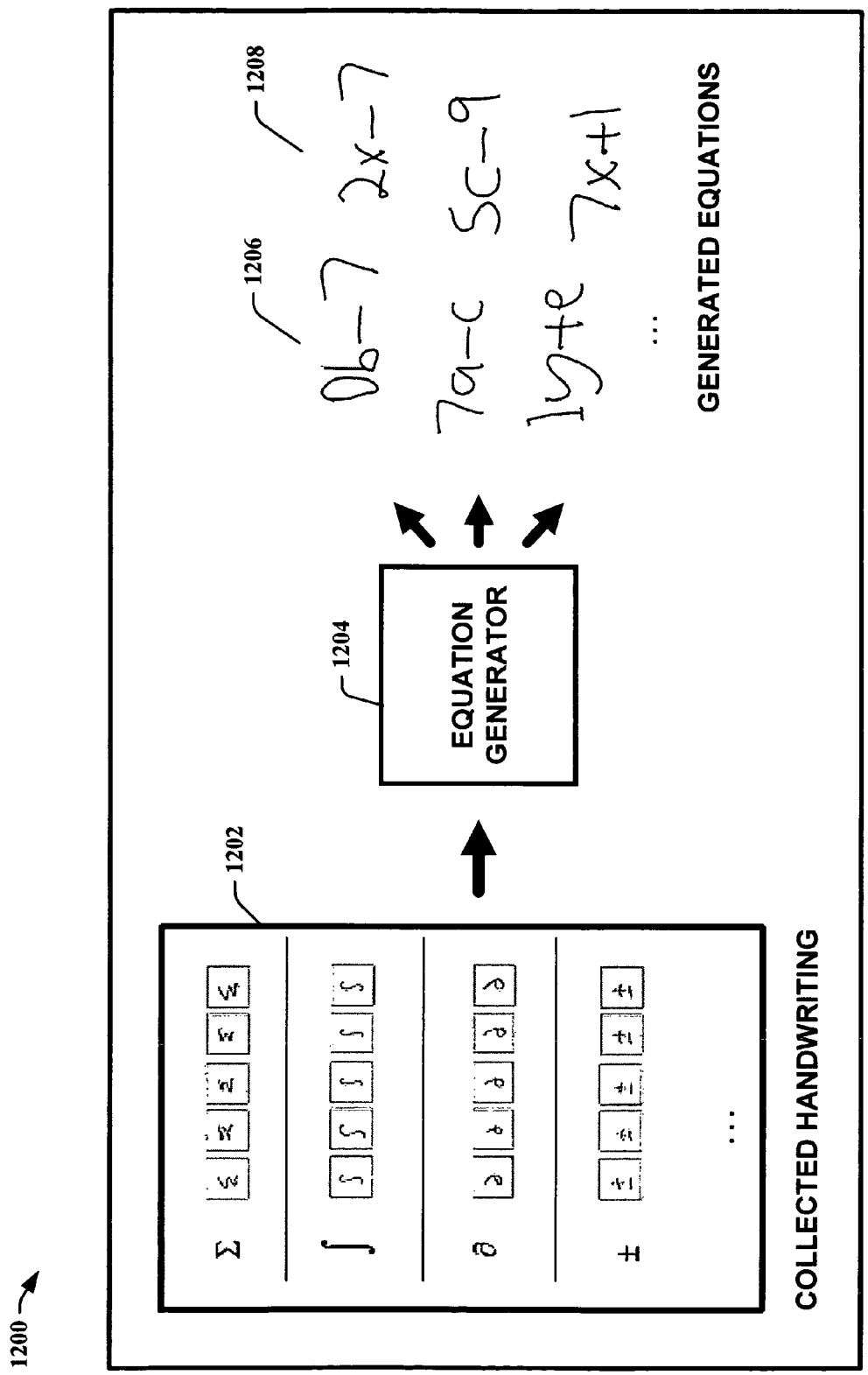
FIG. 12 is an illustration of truth data rendering in accordance with an aspect of the present invention.

To evaluate this instance of the present invention, tests on a corpus of automatically-generated mathematical expressions were run. A modest set of handwritten characters, digits, and mathematical operators from 50 users with 5 examples per class was collected. In an overview process 1200 in FIG. 12, collected truth data 1202 is rendered 1204 into two sets of mathematical expressions 1206, 1208, which serve as training and test data, respectively. Of these examples, short expressions containing digits and operators with a generative grammar were synthesized. The generated expressions are intentionally dense, in order to make the grouping problem more interesting. Also, it is worth noting that although each of the test examples is horizontally-oriented, the present invention's technique applies independent of the layout. The technique has been manually applied to examples with more interesting layouts and show that it works in practice, although the test data does not reflect this condition.

The generated expressions were separated into training and test data, such that 25 users' data made up the training set and the other 25 users made up the test set. This split ensures that the testing is a generalization of the recognizer across different populations. The above system was applied to the test data with three different combination cost functions: sum, max, and avg, as described infra. For sum, the value of $\epsilon$ was varied to see its effect on the overall accuracy. For all of these approaches, the total number of symbols was measured in the test data, and the total number of false positives and false negatives was measured in the results. A false negative occurs any time there is a group of strokes with a specific symbol label in the test data, and that exact group/label does not occur in the test data. A false positive is the converse. For this instance of the present invention, the results included a 94% accuracy for grouping and recognition for the avg combination cost. The full results are shown in Table 1.

TABLE 1

Results on 3840 symbols in the context of generated mathematical expressions.

| Cost | False Pos | False Neg | Total |
|---|---|---|---|
| Sum ($\epsilon = -.2$) | 299 | 243 | 3840 |
| Sum ($\epsilon = -.25$) | 308 | 248 | 3840 |
| Max | 267 | 243 | 3840 |
| Avg | 225 | 202 | 3840 |

Thus, the present invention provides an integrated grouping and recognition system of on-line freeform ink. Grouping is a requirement for recognition in such tasks because each symbol can have a number of strokes. Simple heuristics that group intersecting strokes can work in some cases. In domains which include multi-stroke symbols such as '=' (equals) or '$\pi$' (pi), these heuristics fail. Conversely, it is not uncommon to see strokes from different characters come very close to or intersect each other.

This integrated system first constructs a proximity graph which links pairs of strokes if they are sufficiently close together. The system then enumerates all possible connected subgraphs looking for those that represent valid characters. The notion of proximity is defined so that strokes from the same symbol are always connected. This definition of proximity will necessarily link strokes from neighboring symbols as well. These connected subgraphs are not interpretable as a valid symbol, and are discarded as garbage. A garbage subgraph can also arise if a symbol is undergrouped: e.g., only one of the strokes in a multi-stroke character is included. A fast recognizer based on AdaBoost is trained to recognize all symbol classes as well as a unique class called garbage, which includes subgraphs of strokes that are not valid. In order to address the undergrouping problem, the recognizer operates both on the current candidate strokes as well as the context of the surround strokes.

Dynamic programming is utilized to search for the minimum cost decomposition of the initial proximity graph into connected subgraphs, each of which can be interpreted as a valid symbol. The set of all possible connected subgraphs is efficiently enumerated utilizing an incremental hashing scheme which grows subgraphs one node at a time and efficiently removes duplicates. The recognizer is trained on symbols which come from 25 writers. The instance of the present invention employing this system achieves a 94% simultaneous grouping and recognition rate on test data from 25 different users which was not used during training.

The supra instance of the present invention can be utilized for recognizing and grouping handwritten character strokes in mathematical equations and diagrams. Another instance of the present invention extends the supra instance of the present invention to flowcharts and mixtures of text and graphics. For this instance of the present invention, a more powerful classification scheme and an improved search strategy for discovering the optimal grouping are utilized.

Figure 13:
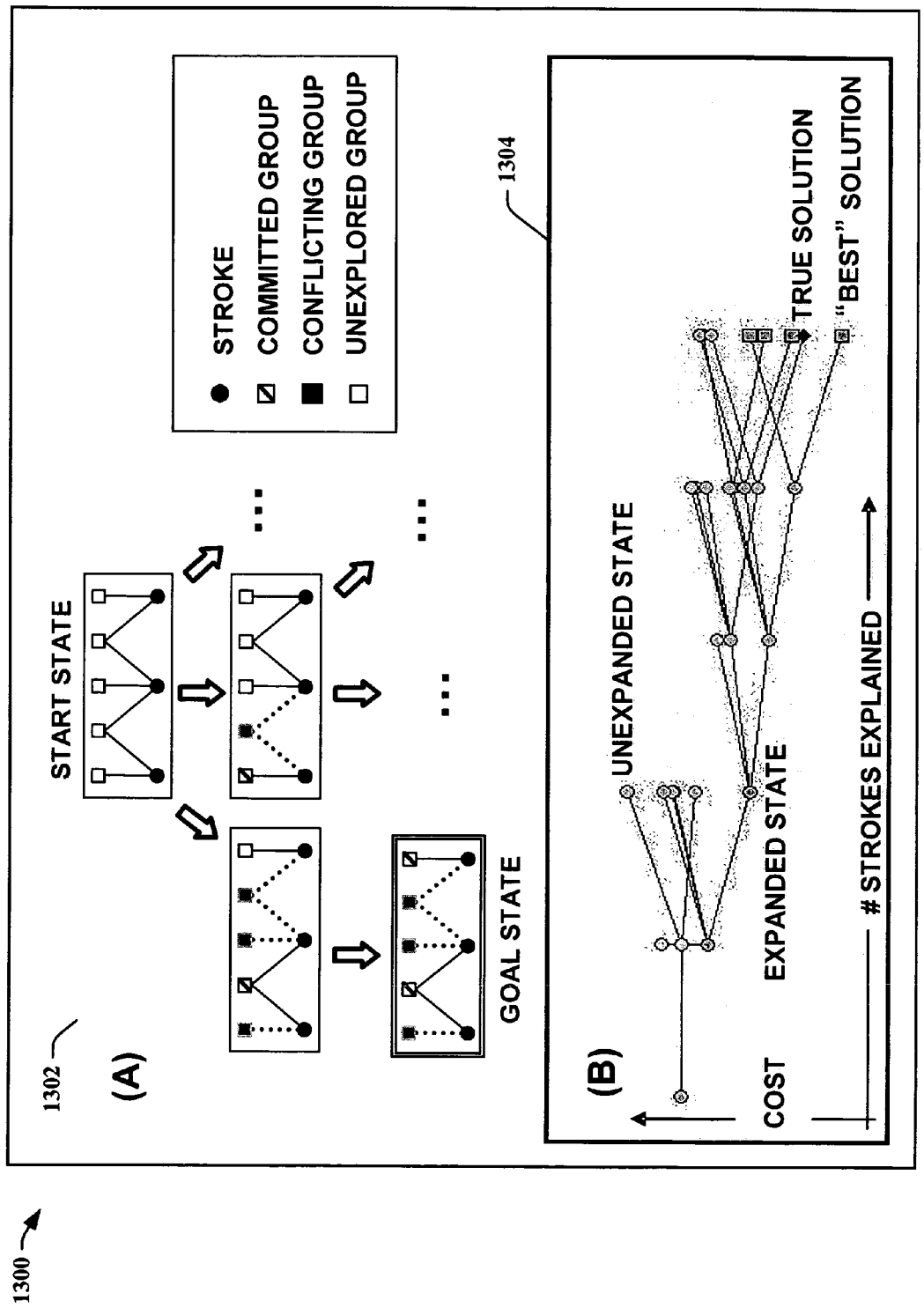
FIG. 13 is an illustration of an A-star search in accordance with an aspect of the present invention.

A typical search problem can be defined as a state space in which each state has a cost, operators to transition between states, and a test to see whether a state is a goal state. A-star is a search technique that utilizes a heuristic underestimate to the goal from each state to prune away parts of the search space that cannot possibly result in an optimal solution (see, Russell, S. and Norvig, P.; *Artificial Intelligence: A Modern Approach*; Prentice Hall; 1995). The quality of the estimate impacts the efficiency of the search: a weak underestimate can result in a slow search and an aggressive underestimate that is not a true underestimate can result in a suboptimal solution (also known as an inadmissible heuristic). In FIG. 13, an illustration of an A-star Search 1300 is shown—(a) a search example showing the hypotheses in each state 1302 and (b) visualization of the search for a small example which yielded the incorrect "best" solution 1304—however, for purposes of this example the search continued to run until it hit the true solution.

Figure 14:
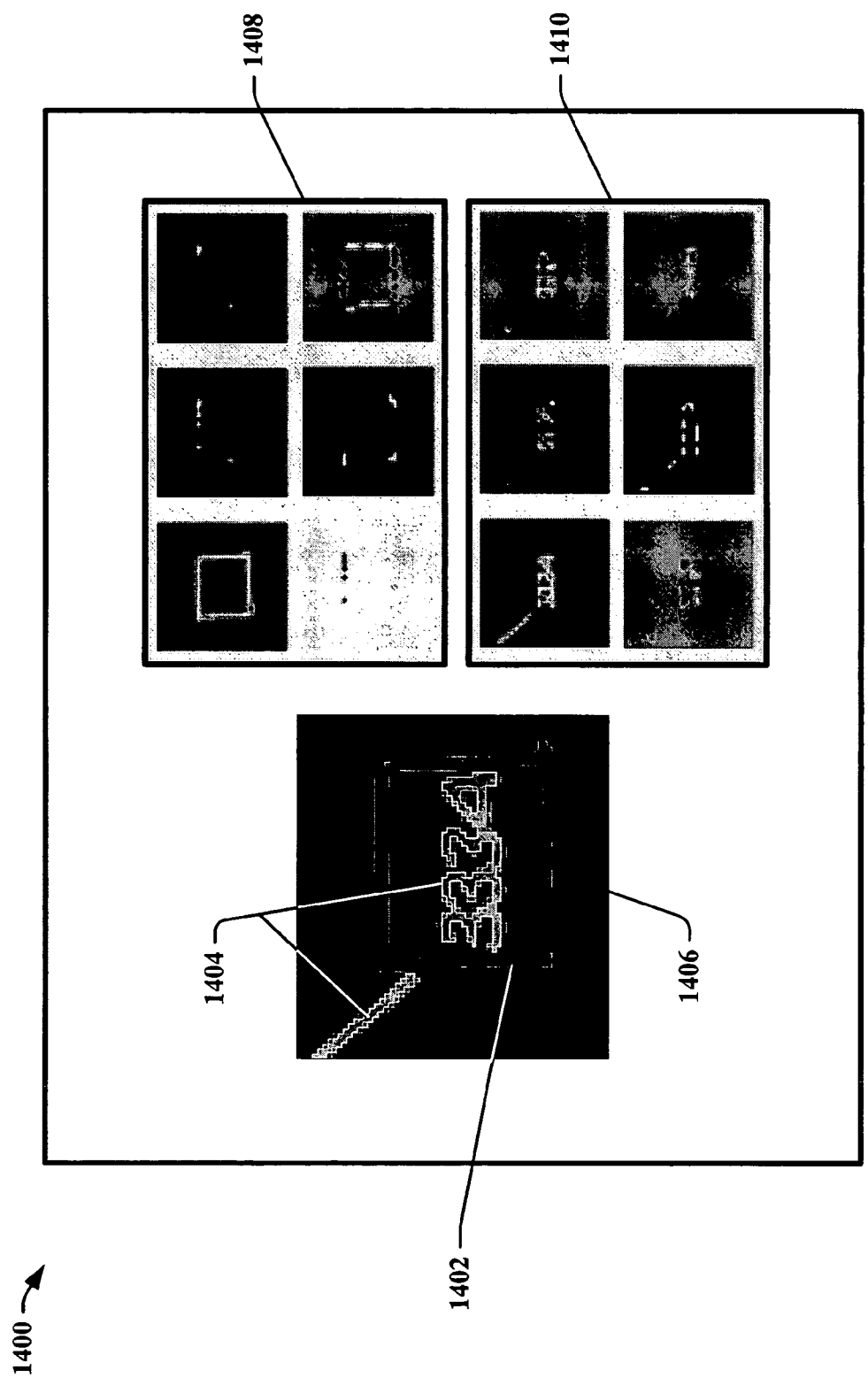
FIG. 14 is an illustration of a classifier input in accordance with an aspect of the present invention.

The search space is a set of partial groupings of strokes. FIG. 14 illustrates a classifier input 1400. The candidate stroke (square) 1402 is shown in dark gray, and its context strokes are shown in light gray 1404. Both candidate 1402 and context 1404 are rendered into 29×29 images. The first image 1406 shows the original ink, the other images 1408, 1410 depict stroke features such as endpoints, curvature, and self-intersections. The initial states are all individual groups of strokes of up to size K. Each group of strokes can combine with another group to form an aggregate partial grouping provided that the two groups do not share any common strokes. Such combinations are the operators of the search. Finally, a state is a goal state if it explains all of the strokes on the page.

As in Equation 1 and the first instance of the present invention, the cost of a grouping is the combination cost of its sub-groups. The underestimate to the goal from a partial grouping is a function of the best explanations of the parents of the strokes unexplained by that grouping. In particular, if a partial grouping explains the first N strokes of a drawing, the underestimate cost for each unexplained stroke is $R(V^*)/|V^*|$ where $V^*$ is the best partial explanation that explains that stroke (note this partial explanation may explain multiple strokes, so divide the cost across the strokes). This is a true underestimate because in the best case those best interpretations can all be taken. It is not a true estimate because some of those interpretations may conflict, in which case they cannot all be taken.

The recognizer utilized in the optimization described above is based on a novel application of AdaBoost. The primary input to the classifier is a rendered image of the strokes that comprise the hypothetical shape. Since the segmentation of the strokes is presently unknown, the strokes passed to the classifier may not make up a shape at all (i.e., garbage).

The observations that are sent to the classifier are sums over the pixel values in rectangular regions of the image. Typically, all possible rectangles are not generated at all possible locations in a 29×29 image, however, 5280 rectangles per image have been generated in some instances. Because there are 12 input images, for example, the classifier receives 63,360 observations per training example! Over the course of its training, the classifier automatically determines which of these observations are relevant to the classification problem and selects a small subset of these observations which should actually be made in practice. The mechanics of this process are described in Schapire and Singer.

This instance of the present invention has also further extended the learning framework to include boosted decision trees. In other instances of the present invention, "stumps" or depth one decision trees are boosted. In other words, each boosted classifier previously reasoned about a single threshold (i.e., a "depth 1" decision tree), whereas in other instances of the present invention the boosted classifiers reason about small conjunctions of thresholds on different rectangles.

While stumps yield good results when the number of classes is small, it doesn't work well for problems with a larger number of similar symbols/characters. In one instance of the present invention, "depth 3" decision trees are utilized. These more general decision trees are more powerful classifiers, capable of modeling complex dependencies between features. The main risk in utilizing a decision tree is that it may overfit the training data. However, by limiting the depth of the tree to approximately three, there has been no tendency to overfit.

Figure 15:
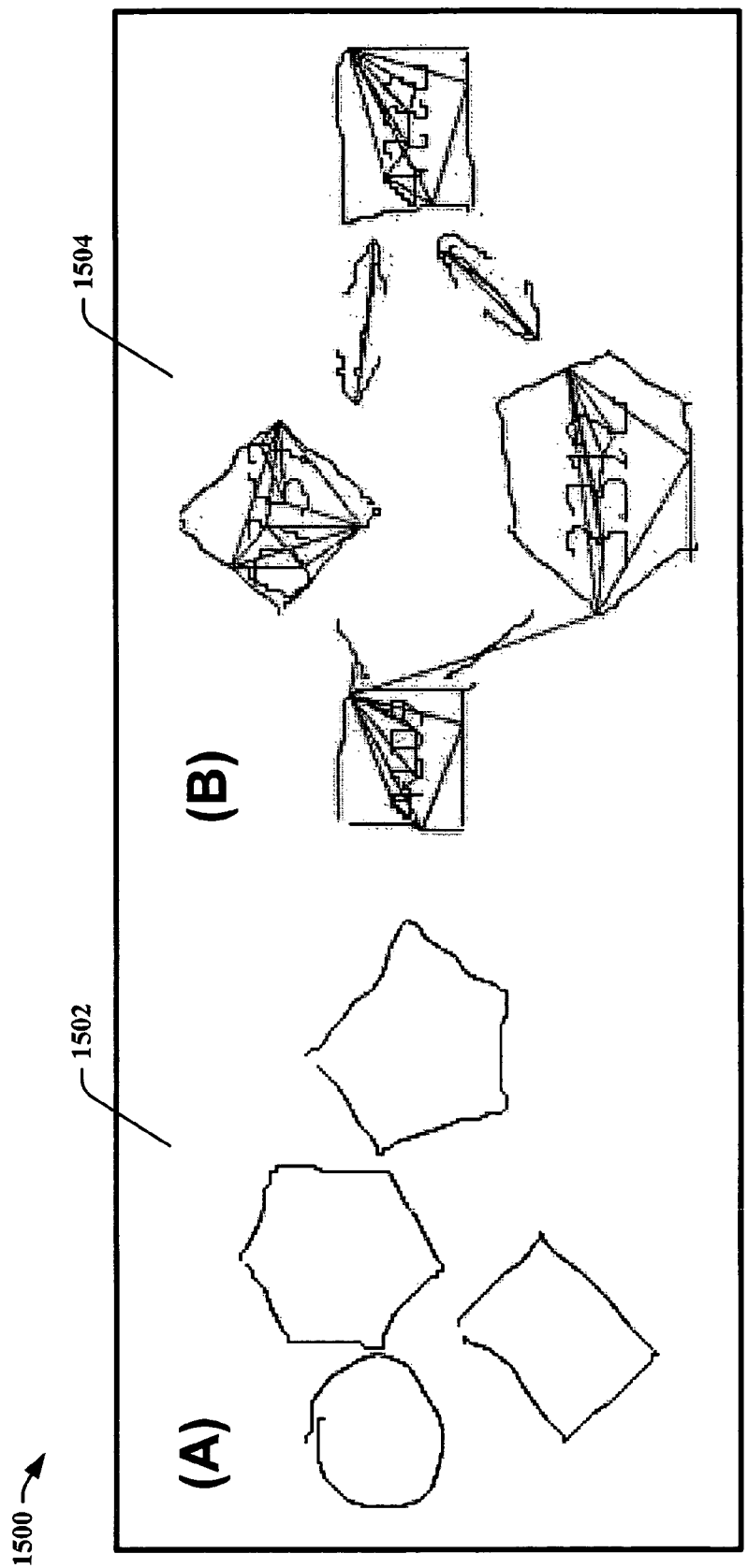
FIG. 15 is an illustration of test examples in accordance with an aspect of the present invention.

This instance of the present invention has been evaluated utilizing the publicly-available HHReco (available at http://www.eecs.berkeley.edu/~hwawen/research/hhreco/index.html) sketched shape database (see, Hse and Newton), containing 7791 multi-stroke examples over 13 shape classes, collected from 19 different users. FIG. 15 illustrates such test examples 1500—(a) a randomly generated collection of shapes 1502 and (b) a synthetic flowchart composed of shapes, arrows, and characters collected from real users 1504. Its neighborhood graph is superimposed to give an illustration of the size of the problem. On randomly-generated shape scenes in which shapes are placed near one another in random patterns (FIG. 15(a) 1502), instances of the present invention achieved 97% accuracy for both grouping and recognition simultaneously, and over 99% accuracy for grouping alone (utilizing 80/20 train/test split).

The present invention was also evaluated on a more complex set of randomly synthesized flowcharts. Each flowchart was generated from the shapes {square, ellipse, diamond, hexagon, pentagon}, the connectors {⇆, →, -}, and the digits {0-9}, in which four nodes were synthesized in random non-overlapping locations with randomly sampled edges between them, and four digits were contained in each node (FIG. 15(b) 1504). For this example, instances of the present invention achieved an 85% grouping/recognition accuracy, and a 90% grouping accuracy.

The results are shown in Table 2 infra. They indicate that small-depth boosted decision trees are roughly equivalent to stumps for sketch recognition problems with a small number of classes. However, as the number of classes grows, the decision trees show a modest improvement over the stumps. These results also show that digit recognition is substantially more difficult than shape recognition—the error rate on flowcharts without digits was much lower than the flowchart with digits. Furthermore, the errors that did occur in the flowcharts with digits were mostly errors on the digits.

TABLE 2

Grouping and recognition results. Data sets include shapes (shape), flowcharts (flow), and flowcharts with digit labels (flow2). False pos/neg refer to errors in grouping and recognition. FP/FN Grp refer to grouping errors only. Truth refers to the number of symbols in the true grouping.

| Data set | DT Depth | False Pos | False Neg | FP Grp | FN Grp | Truth Count |
|---|---|---|---|---|---|---|
| shape | 1 | 16 | 30 | 6 | 11 | 600 |
| shape | 3 | 25 | 18 | 9 | 7 | 600 |
| flow | 1 | 80 | 78 | 18 | 14 | 1200 |
| flow | 3 | 76 | 58 | 21 | 8 | 1200 |
| flow2 | 1 | 459 | 430 | 107 | 134 | 2400 |
| flow2 | 3 | 330 | 348 | 107 | 134 | 2400 |

Instances of the present invention are able to process files such as the one shown in FIG. 15(*a*) 1502 in approximately 0.1 seconds on a 1.7 GHz Tablet PC. Larger examples such as FIG. 15(*b*) 1504 currently take approximately 8 seconds to process. Nearly 90% of the time is spent rendering the examples to bitmaps (FIG. 8(*d*) 808) since there are an order of magnitude more symbol candidates than there are symbols in the file.

This example had several limitations. As in the shape experiment, both the training and test data were synthesized. However, the HHReco shape data was utilized and synthesized with arrows and digits collected from additional users. The test and training users were kept separate to show that the present invention is able to generalize and to keep a one-to-one mapping between shape writers and digit/arrow writers.

The present invention provides methods for grouping and recognized sketched shapes that are efficient and accurate yet rely solely on spatial information and are completely example-based. The present invention is equally applicable to sketched shapes, arrows, and printed handwritten characters. The present invention can also be applied to the field of sketch recognition and sketch-based user interfaces in general. It provides a recognizer that achieves high accuracy for shapes, symbols, and arrows and the like, and places no constraints on the user in terms of order or specific page layout of those symbols is achievable with the present invention. With such a recognizer available off the shelf, the designer of a sketch-based user interface would not have to make compromises on which symbols to include or how the user should enter those symbols, and could instead focus on defining the right symbol set for the problem, an appropriate correction user interface, and so on.

Because the present invention is entirely based on machine learning and requires no hand-coded heuristics, it can be easily retargeted to different domains, as illustrated by instances of the present invention first applied to mathematics and then applied to flowcharts. From a recognition standpoint, the present invention relies on very few parameters—the maximum number of strokes in each character (for example, 6), and a proximity threshold for building a neighborhood graph. Furthermore, it relies entirely on the concise cost function for its answer and so improvements in accuracy can be achieved through improvements of the cost function and the underlying recognizer, without needing to modify any of the rest of the algorithm.

Additionally, the present invention can facilitate in interpretation of stroke inputs. Thus, the present invention can be utilized to determine whether an input entity is complete, and if not, it can complete the entity. For example, if a particular chemical notation is incomplete, the present invention can retrieve information from a database of chemical compounds and resolve a "best guess" as to what the input entity represents. Similarly, if an input is a series of equations, the present invention can facilitate in determining expressions and sub-expressions based on recognized characters. The present invention can even facilitate in deriving an expression from the characters.

Figure 16:
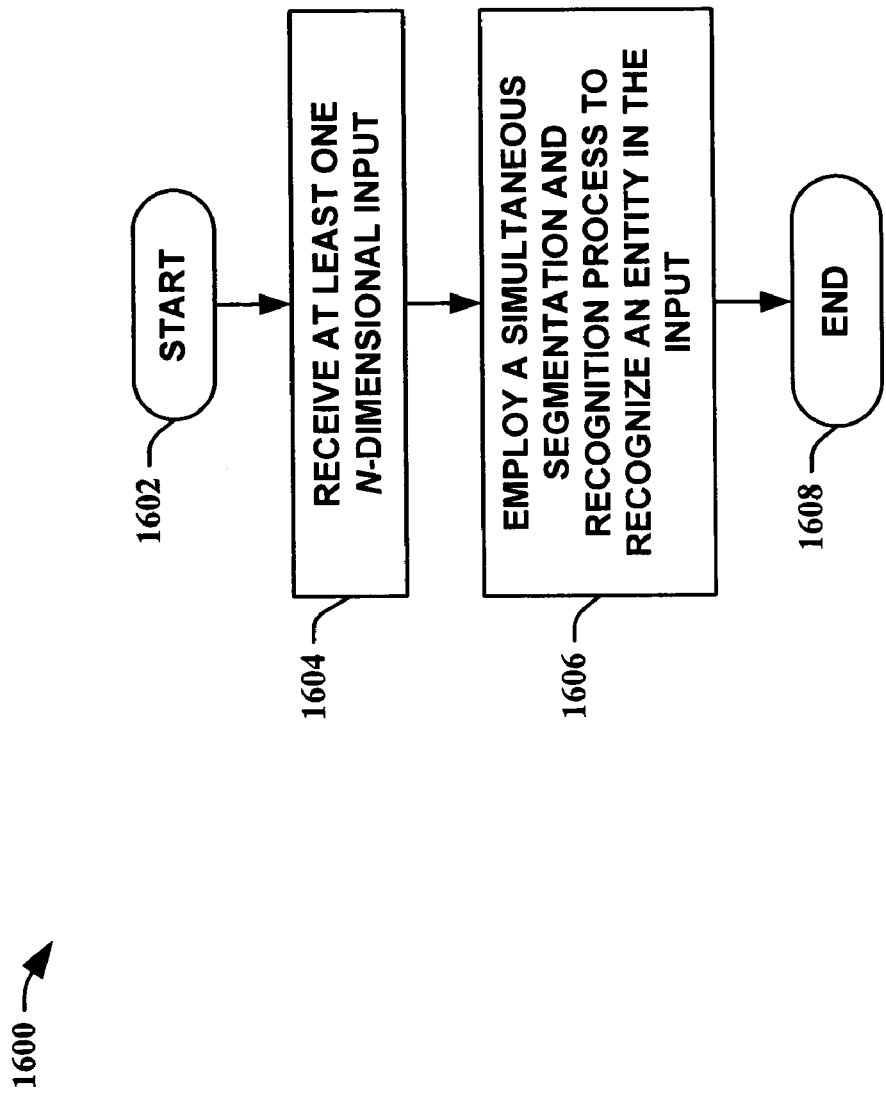
FIG. 16 is a flow diagram of a method of facilitating recognition in accordance with an aspect of the present invention.
Figure 17:
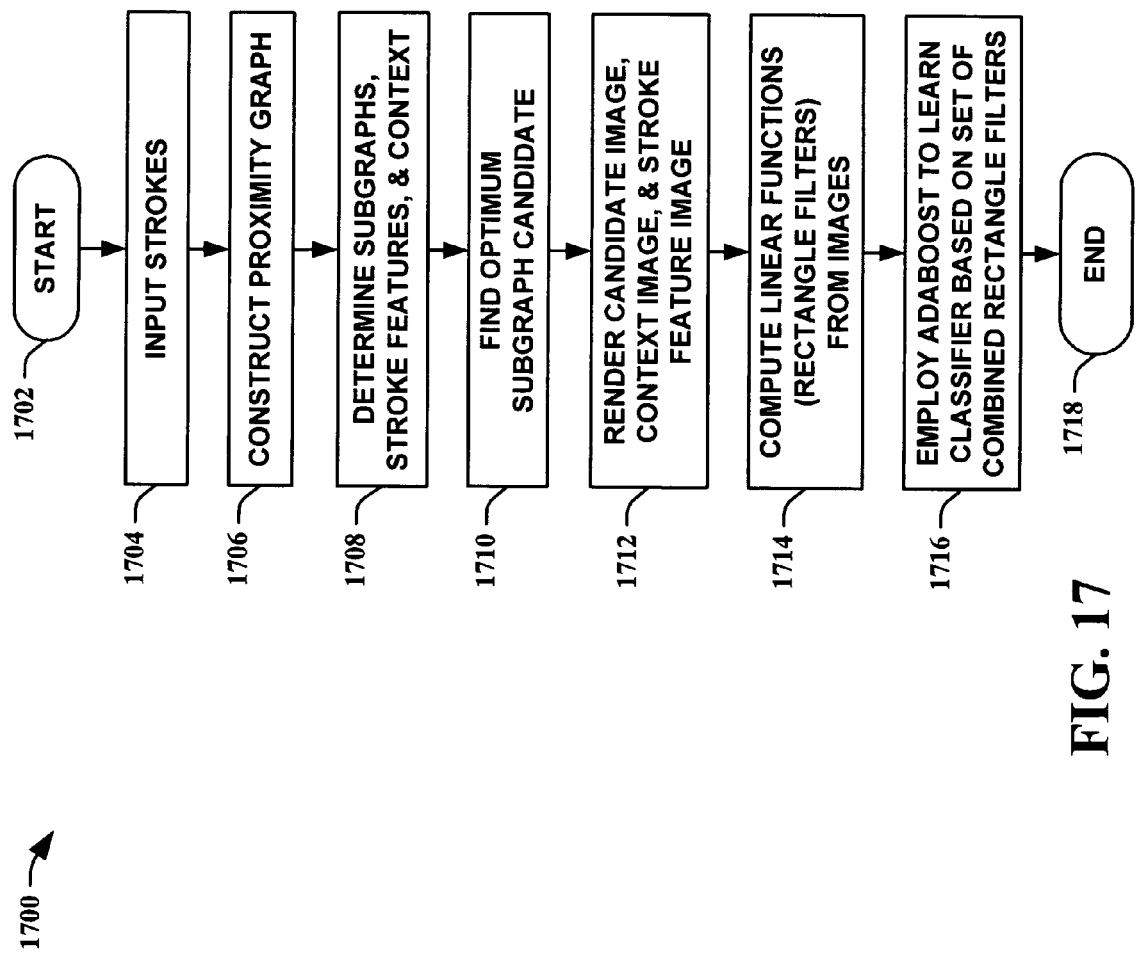
FIG. 17 is a flow diagram of a method of facilitating training of a recognizer in accordance with an aspect of the present invention.

In view of the exemplary systems shown and described above, methodologies that may be implemented in accordance with the present invention will be better appreciated with reference to the flow charts of FIGS. 16-17. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the present invention.

In FIG. 16, a flow diagram of a method 1600 of facilitating recognition in accordance with an aspect of the present invention is shown. The method 1600 starts 1602 by receiving at least one P-dimensional input 1604. Instances of the present invention can employ 1-dimensional, 2-dimensional, and 3-dimensional inputs and the like. The input, for example, can include strokes produced by a drawing device such as a pen and/or pencil and/or an electronic pixel drawing device and/or pixels produced by an electronic scanning device. In general, the strokes include any entities (e.g., markings) that can be optically interpreted (i.e., recognized). The input typically includes environmental information or "context" information as well. Instances of the present invention employ context information to produce higher accuracy in the segmentation and recognition processes. Once the input is received, a simultaneous segmentation and recognition process is employed that recognizes an entity in the input 1606, ending the flow 1608. In one instance of the present invention the simultaneous segmentation and recognition process utilizes proximity graphs of input strokes that are subdivided into subgraphs. These subgraphs are then rendered into images that are then "recognized" by a classifier based on AdaBoost. The classifier itself is automatically trained without requiring any manual entries for parameters such as thresholds.

Referring to FIG. 17, a flow diagram of a method 1700 of facilitating training of a recognizer in accordance with an aspect of the present invention is depicted. The flow 1700 starts 1702 by receiving input strokes 1704. The strokes themselves can be comprised of entities as described supra. A proximity graph is then constructed where the strokes are represented by vertices and their relationships by edges 1706. Subgraphs are then determined along with stroke features and contexts 1708. In one instance of the present invention, the subgraphs are determined by a threshold limit that dictates the minimum distance required for vertices to be considered "in proximity" and thus a subgroup. Vertices are considered neighbors if the minimum distance between convex hulls of their strokes is less than a threshold. One skilled in the art can appreciate, however, that any reasonable proximity measure can generate similar recognition results as long as the neighborhood (proximity) graph contains edges between strokes in the same symbol. An optimum subgraph candidate is then found 1710. The optimum candidate is typically a subgraph with a minimum cost based on Equation 1:

$$C(\{V_i\})=\Phi(R(V_1),R(V_2),\ldots,R(V_n)) \quad \text{(Eq. 1)}$$

This equation is inclusive of recognition costs, R, and combination costs, $\Phi$. In one instance of the present invention, dynamic programming is utilized to facilitate the cost calculation process. This typically involves an iterative process from 1 to K, where K is the stroke (vertices) subgraph limit. Each subgraph is expanded by all of the edges on its horizon, duplicates are eliminated, expanded again, and so forth, up through size K, eliminating the propagation of duplicates in each iteration. In another instance of the present invention, an A-star search is utilized to find the optimum candidate. The A-star search utilizes a heuristic underestimate to the goal from each state to remove parts of the search space that cannot possibly result in an optimal solution. One skilled in the art will also appreciate that the present invention can employ any cost-directed search method to facilitate in finding the optimum solution. Thus, besides the A-star search method, the present invention can utilize other cost-directed search methods such as, for example, a best-first search method and a branch-and-bound search method and the like. When the optimum candidate has been determined, images of the candidate, context, and stroke features are then rendered into images 1712. One skilled in the art will appreciate that the above sequence is also applicable for pre-processing of a stroke input for a recognizer that is already trained. These images are then utilized to compute linear functions or "rectangle filters" 1714. AdaBoost is then employed to learn a classifier that is based on a set of combined rectangle filters 1716, ending the flow 1718. Essentially, the final classifier is comprised of a set of weak classifiers that are derived through an iterative process described previously. The final classifier is then utilized in a recognizer that employs the present invention. This permits an automatically trained simultaneous segmentation and recognition process that does not require linear space and time limitations imposed by traditional systems.

Figure 18:
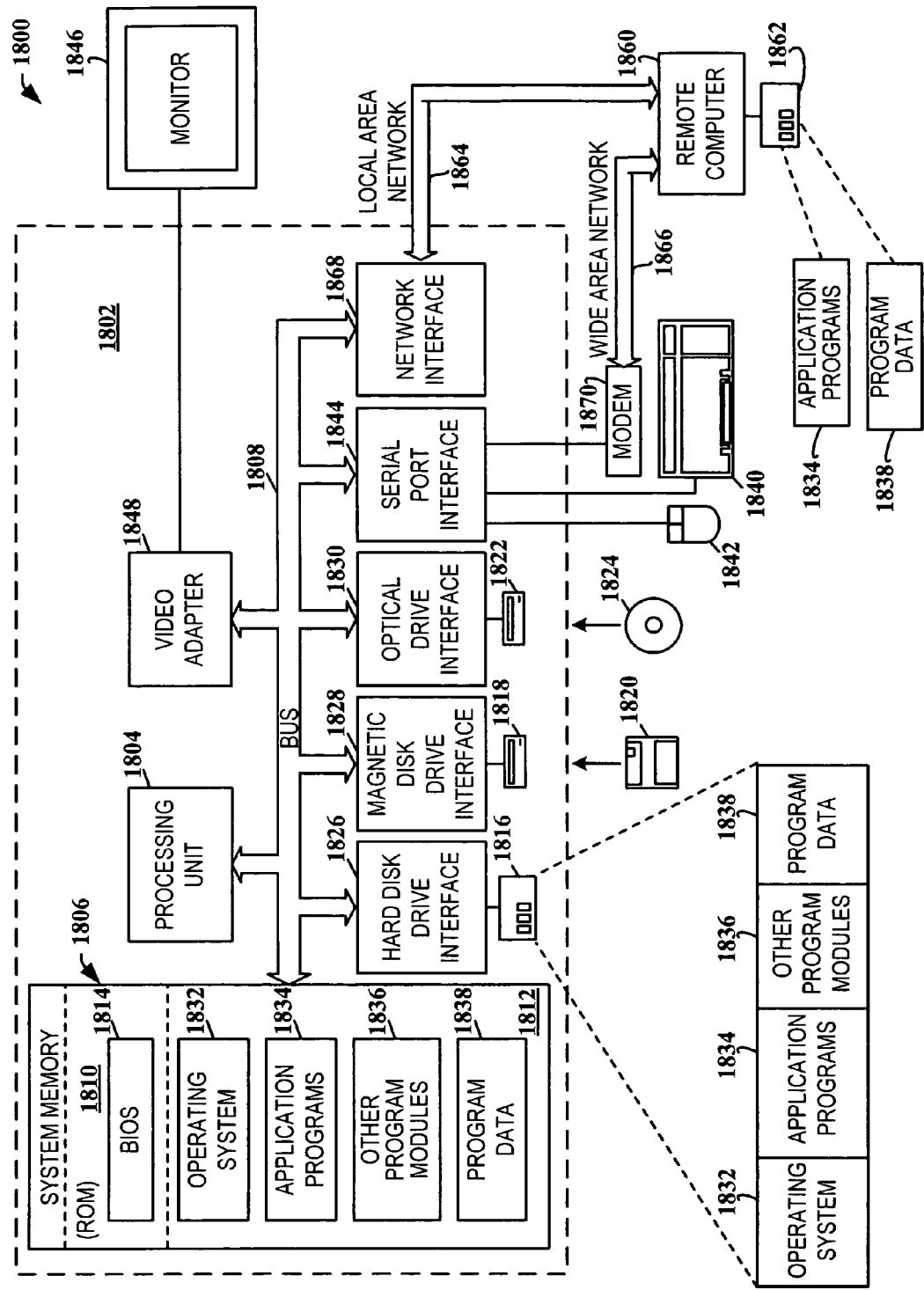
FIG. 18 illustrates an example operating environment in which the present invention can function.

In order to provide additional context for implementing various aspects of the present invention, FIG. 18 and the following discussion is intended to provide a brief, general description of a suitable computing environment 1800 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 18, an exemplary system environment 1800 for implementing the various aspects of the invention includes a conventional computer 1802, including a processing unit 1804, a system memory 1806, and a system bus 1808 that couples various system components, including the system memory, to the processing unit 1804. The processing unit 1804 may be any commercially available or proprietary processor. In addition, the processing unit may be implemented as multi-processor formed of more than one processor, such as may be connected in parallel.

The system bus 1808 may be any of several types of bus structure including a memory bus or memory controller, a peripheral bus, and a local bus using any of a variety of conventional bus architectures such as PCI, VESA, Microchannel, ISA, and EISA, to name a few. The system memory 1806 includes read only memory (ROM) 1810 and random access memory (RAM) 1812. A basic input/output system (BIOS) 1814, containing the basic routines that help to transfer information between elements within the computer 1802, such as during start-up, is stored in ROM 1810.

The computer 1802 also may include, for example, a hard disk drive 1816, a magnetic disk drive 1818, e.g., to read from or write to a removable disk 1820, and an optical disk drive 1822, e.g., for reading from or writing to a CD-ROM disk 1824 or other optical media. The hard disk drive 1816, magnetic disk drive 1818, and optical disk drive 1822 are connected to the system bus 1808 by a hard disk drive interface 1826, a magnetic disk drive interface 1828, and an optical drive interface 1830, respectively. The drives 1816-1822 and their associated computer-readable media provide nonvolatile storage of data, data structures, computer-executable instructions, etc. for the computer 1802. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1800, and further that any such media may contain computer-executable instructions for performing the methods of the present invention.

A number of program modules may be stored in the drives 1816-1822 and RAM 1812, including an operating system 1832, one or more application programs 1834, other program modules 1836, and program data 1838. The operating system 1832 may be any suitable operating system or combination of operating systems. By way of example, the application programs 1834 and program modules 1836 can include a recognition scheme in accordance with an aspect of the present invention.

A user can enter commands and information into the computer 1802 through one or more user input devices, such as a keyboard 1840 and a pointing device (e.g., a mouse 1842). Other input devices (not shown) may include a microphone, a joystick, a game pad, a satellite dish, a wireless remote, a scanner, or the like. These and other input devices are often connected to the processing unit 1804 through a serial port interface 1844 that is coupled to the system bus 1808, but may be connected by other interfaces, such as a parallel port, a game port or a universal serial bus (USB). A monitor 1846 or other type of display device is also connected to the system bus 1808 via an interface, such as a video adapter 1848. In addition to the monitor 1846, the computer 1802 may include other peripheral output devices (not shown), such as speakers, printers, etc.

It is to be appreciated that the computer 1802 can operate in a networked environment using logical connections to one or more remote computers 1860. The remote computer 1860 may be a workstation, a server computer, a router, a peer device or other common network node, and typically includes many or all of the elements described relative to the computer 1802, although for purposes of brevity, only a memory storage device 1862 is illustrated in FIG. 18. The logical connections depicted in FIG. 18 can include a local area network (LAN) 1864 and a wide area network (WAN) 1866. Such networking environments are commonplace in offices, enterprise-wide computer networks, intranets and the Internet.

When used in a LAN networking environment, for example, the computer 1802 is connected to the local network 1864 through a network interface or adapter 1868. When used in a WAN networking environment, the computer 1802 typically includes a modem (e.g., telephone, DSL, cable, etc.) 1870, or is connected to a communications server on the LAN, or has other means for establishing communications over the WAN 1866, such as the Internet. The modem 1870, which can be internal or external relative to the computer 1802, is connected to the system bus 1808 via the serial port interface 1844. In a networked environment, program modules (including application programs 1834) and/or program data 1838 can be stored in the remote memory storage device 1862. It will be appreciated that the network connections shown are exemplary and other means (e.g., wired or wireless) of establishing a communications link between the computers 1802 and 1860 can be used when carrying out an aspect of the present invention.

In accordance with the practices of persons skilled in the art of computer programming, the present invention has been described with reference to acts and symbolic representations of operations that are performed by a computer, such as the computer 1802 or remote computer 1860, unless otherwise indicated. Such acts and operations are sometimes referred to as being computer-executed. It will be appreciated that the acts and symbolically represented operations include the manipulation by the processing unit 1804 of electrical signals representing data bits which causes a resulting transformation or reduction of the electrical signal representation, and the maintenance of data bits at memory locations in the memory system (including the system memory 1806, hard drive 1816, floppy disks 1820, CD-ROM 1824, and remote memory 1862) to thereby reconfigure or otherwise alter the computer system's operation, as well as other processing of signals. The memory locations where such data bits are maintained are physical locations that have particular electrical, magnetic, or optical properties corresponding to the data bits.

Figure 19:
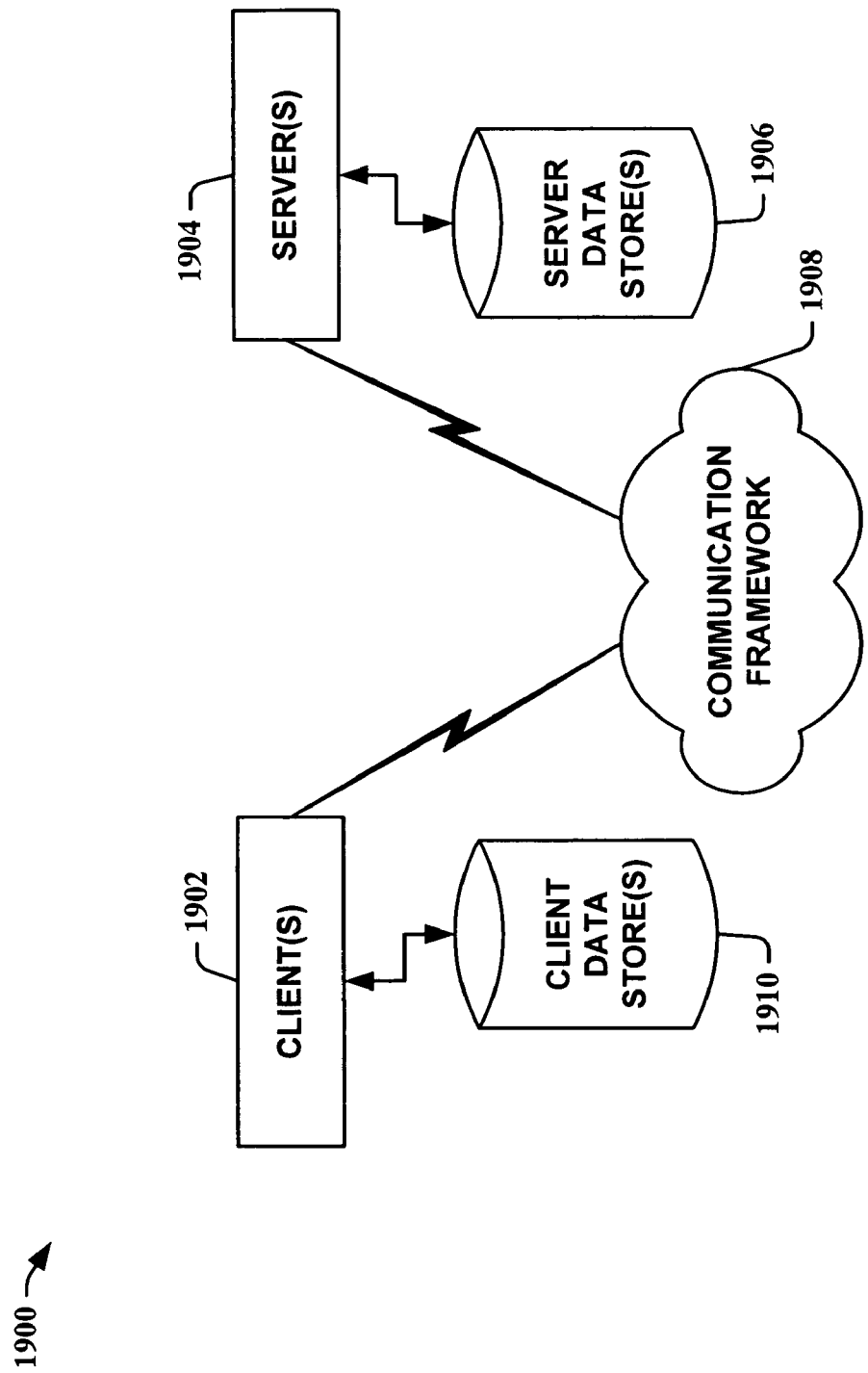
FIG. 19 illustrates another example operating environment in which the present invention can function.

FIG. 19 is another block diagram of a sample computing environment 1900 with which the present invention can interact. The system 1900 further illustrates a system that includes one or more client(s) 1902. The client(s) 1902 can be hardware and/or software (e.g., threads, processes, computing devices). The system 1900 also includes one or more server(s) 1904. The server(s) 1904 can also be hardware and/or software (e.g., threads, processes, computing devices). One possible communication between a client 1902 and a server 1904 may be in the form of a data packet adapted to be transmitted between two or more computer processes. The system 1900 includes a communication framework 1908 that can be employed to facilitate communications between the client(s) 1902 and the server(s) 1904. The client(s) 1902 are connected to one or more client data store(s) 1910 that can be employed to store information local to the client(s) 1902. Similarly, the server(s) 1904 are connected to one or more server data store(s) 1906 that can be employed to store information local to the server(s) 1904.

In one instance of the present invention, a data packet transmitted between two or more computer components that facilitates recognition is comprised of, at least in part, information relating to a spatial recognition system that utilizes, at least in part, a simultaneous segmentation and recognition process to recognize an entity.

It is to be appreciated that the systems and/or methods of the present invention can be utilized in recognition facilitating computer components and non-computer related components alike. Further, those skilled in the art will recognize that the systems and/or methods of the present invention are employable in a vast array of electronic related technologies, including, but not limited to, computers, servers and/or handheld electronic devices, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer readable medium having stored thereon executable software comprising:

a component that receives input comprising at least one entity comprising one or more strokes, wherein strokes associated with the input are generated in a non-linear sequence in time; and a recognition component that utilizes a simultaneous segmentation and recognition process to recognize the at least one entity in the input, the recognition component recognizes the at least one entity based at least in part on a predetermined minimum threshold distance between convex hulls of respective strokes associated with the input, wherein strokes are associated with the at least one entity when distance between convex hulls of respective strokes is less than the predetermined minimum threshold distance, and a predetermined maximum number of strokes per entity, and further wherein the simultaneous segmentation and recognition process comprises:

linking strokes of the input in a graph to form connected subgraphs;

applying a search method over the connected subgraphs of a proximity graph to determine an optimal decomposition; and recognizing the optimal decomposition via employment of a classifier, wherein the search method employs an optimization method comprising:

utilizing a cost optimization function to facilitate in segmentation and recognition to determine an optimum grouping and labeling according to Equation (1):

$$C([V_i]) = \Phi(R(V_1), R(V_2), \ldots, R(V_n));\quad\quad\text{(Eq. 1)}$$

where $V_i$ is a subset of vertices which form a decomposition of an input, R is a best recognition result for the set of vertices, the function $\Phi$ is a combination cost, and C represents an overall cost of a particular grouping $[V_i]$, wherein the segmentation and recognition process further provides for subsequent correction of the one or more strokes associated with the input generated in a non-linear sequence in time.

2. The system of claim 1, the recognition component retrieves information from a database to complete an incomplete entity to determine the at least one entity based at least in part on a best determination as to what the input represents, the best determination is made based at least in part on interpretation of the strokes associated with the incomplete entity, the at least one entity is at least one of an equation or a chemical notation.

3. The system of claim 1, the input comprising a geometric structure existing in a P-dimensional space, the P-dimensional space comprising at least one of a 1-dimensional space, a 2 dimensional space or a 3 dimensional space.

4. The system of claim 1, the recognition component employs dynamic programming to facilitate the simultaneous segmentation and recognition process.

5. The system of claim 1, the recognition component utilizes context information to facilitate the simultaneous segmentation and recognition process.

6. The system of claim 1, the recognition component utilizes stroke feature information to facilitate the simultaneous segmentation and recognition process.

7. The system of claim 1, the entity comprising at least one of a textual entity or a graphical entity.

8. The system of claim 1, the entity comprising at least one of a set of strokes or a set of pixels.

9. The system of claim 1, the input comprising at least one of a non-linear sequence in time or a non-linear sequence in space.

10. The system of claim 1, the recognition component employs spatial queues obtained from the input to recognize the entity.

11. The system of claim 1, further comprising:
a training component that automatically trains the recognition component to identify the at least one entity from the input.

12. The system of claim 11, the training component employs machine learning to solve segmentation parameters.

13. The system of claim 1, the at least one entity comprising characters related to an equation.

14. The system of claim 13, the recognition component determines sub-expressions of the equation to complete an incomplete entity based at least in part on characters that the recognition component recognizes.

15. The system of claim 14, the recognition component derives the equation to complete an incomplete entity based at least in part on characters recognized by the recognition component.

16. The system of claim 1, the recognition component employs a classifier to facilitate in the simultaneous segmentation and recognition process.

17. The system of claim 16, the classifier comprising a trainable classifier that learns a function that penalizes incorrect segmentations.

18. The system of claim 1 further comprising:
an optimization component that facilitates the segmentation and recognition process via an optimization that resolves an optimum segmentation and recognition.

19. The system of claim 18, the optimization comprising a cost-directed search method.

20. The system of claim 19, the cost-directed search method comprising at least one of an A-star search method, a best-first search method, or a branch-and-bound search method.

21. The system of claim 18, the optimization comprising an optimization that employs a dynamic programming process.

22. The system of claim 1, the recognition component utilizes ambiguities in segmentation to facilitate recognition.

23. The system of claim 1, the recognition component utilizes ambiguities in recognition to facilitate segmentation.

24. A method for facilitating recognition, comprising:
receiving at least one P-dimensional input comprising a plurality of strokes that are generated in a non-linear sequence in time;

determining at least two potential groupings of strokes associated with the input based at least in part on a predetermined proximity threshold between respective strokes associated with the input and a predetermined maximum number of strokes per entity, to facilitate recognizing at least one entity;

determining a respective best recognition result for each subset of strokes associated with each potential grouping of the at least two potential groupings, wherein each potential grouping can comprise one or more subsets of strokes corresponding to one or more entities of the at least one entity;

calculating a combination cost relating to the cost of combining the respective best recognition results associated with each potential grouping of the at least two potential groupings;

calculating a respective total cost for each potential grouping of the at least two potential groupings as a function of respective combination costs of each potential grouping of the at least two potential groupings;

selecting a potential grouping of the at least two potential groupings that has a best cost as a best grouping of strokes;

utilizing the best grouping of strokes to facilitate recognizing the at least one entity in the input; and employing a simultaneous segmentation and recognition process to recognize the at least one entity in the input based at least in part on a predetermined proximity threshold between respective strokes associated with the input, wherein strokes are associated with the at least one entity when distance between convex hulls of respective strokes is less than the predetermined proximity threshold, and a predetermined number of strokes per entity, and further wherein the simultaneous segmentation and recognition process comprises:

linking strokes of the input in a graph to form connected subgraphs;

applying a search method over the connected subgraphs of the proximity graph to determine an optimal decomposition; and recognizing the optimal decomposition via employment of a classifier, wherein the search method employs an optimization method comprising:

utilizing a cost optimization function to facilitate in segmentation and recognition to determine an optimum grouping and labeling according to:

$$C(\{V_i\})=\Phi(R(V_1),R(V_2),\ldots,R(V_n));$$

where $V_i$ is a subset of vertices which form a decomposition of an input, R is a best recognition result for the set of vertices, the function $\Phi$ is a combination cost, and C represents an overall cost of a particular grouping $\{V_i\}$, wherein the segmentation and recognition process further provides for subsequent correction of the one or more strokes associated with the input generated in a non-linear sequence in time.

25. The method of claim 24, the P-dimensional input comprising at least one of a 1-dimensional input, a 2-dimensional input, or a 3-dimensional input.

26. The method of claim 24, the input comprising at least one of a textual input or a graphical input.

27. The method of claim 24, the input comprising at least one of a set of optically recognizable marks or a set of pixels.

28. The method of claim 24, the input comprising at least one of a non-linear sequence in time or a non-linear sequence in space.

29. The method of claim 24, the simultaneous segmentation and recognition process comprising a scale and rotation invariant spatial recognition process.

30. The method of claim 24, the classifier comprising a classifier based on, at least in part, rendered images of strokes, stroke features, and context.

31. The method of claim 24, the linking of strokes to form subgraphs comprising:

constructing a neighborhood graph G=(V, E); where vertices, V, correspond to strokes and edges, E, correspond to neighbor relationships between strokes;

linking vertices based on geometric relationships; and enumerating connected subsets, $V_i$ where $|V_i| \leq K$; where K is a threshold value that limits a size of a subgraph.

32. The method of claim 24 further comprising:

determining a context of a subgraph; and employing the context for facilitating classification of the connected subgraphs.

33. The method of claim 24, the simultaneous segmentation and recognition process further comprising:

automatically learning at least one of the classifier or classification parameters from a training set of examples.

34. The method of claim 24, the search method comprising a cost-directed search method.

35. The method of claim 34, the cost-directed search method comprising at least one of an A-star search method, a best-first search method, or a branch-and-bound search method.

36. The method of claim 24, the stroke features comprising at least one of a curvature of a stroke, orientation of a stroke, or at least one end point of a stroke.

37. The method of claim 24 further comprising:

limiting the connected subgraphs to a predetermined fixed size.

38. The method of claim 24, the recognizing the optimal subgraph further comprising:

employing a machine learning-based classifier to distinguish valid and invalid subgraphs.

39. The method of claim 38, the machine learning-based classifier comprising at least one of AdaBoost, Neural Networks, Support Vector Machines, or Bayesian Classification.

40. The method of claim 38 further comprising:

utilizing limited-depth decision trees to facilitate the AdaBoost-based recognition method.

41. The method of claim 24, the recognizing the optimal decomposition further comprising:

providing validity of a decomposition and a label for each valid subgraph.

42. A system that facilitates recognition comprising:

means for receiving at least one input comprising, at least in part, a P-dimensional space of at least one entity, each entity comprising one or more strokes, wherein strokes are generated in a non-linear sequence in time; and means for utilizing a simultaneous segmentation and recognition process to recognize the at least one entity from the input as a function of a predetermined proximity threshold between convex hulls of respective strokes, wherein strokes are associated with the at least one entity when distance between convex hulls of respective strokes is less than the predetermined proximity threshold, and a predetermined maximum number of strokes per entity, and further wherein the simultaneous segmentation and recognition process comprising:

linking strokes of the input in a graph to form connected subgraphs;

applying a search method over the connected subgraphs of a proximity graph to determine an optimal decomposition; and recognizing the optimal decomposition via employment of a classifier, the search method employs an optimization method comprising:

utilizing a cost optimization function to facilitate in segmentation and recognition to determine an optimum grouping and labeling according to Equation (1):

$$C(\{V_i\})=\Phi(R(V_1),R(V_2),\ldots,R(V_n));$$

where $V_i$ is a subset of vertices which form a decomposition of an input, R is a best recognition result for the set of vertices, the function $\Phi$ is a combination cost, and C represents an overall cost of a particular grouping $\{V_i\}$, wherein the segmentation and recognition process further provides for subsequent correction of the one or more strokes associated with the input generated in a non-linear sequence in time.

43. A device employing the method of claim 24 comprising at least one of a computer, a server, or a handheld electronic device.

44. A device employing the system of claim 1 comprising at least one of a computer, a server, or a handheld electronic device.

* * * * *

UNITED STATES PATENT AND TRADEMARK OFFICE
CERTIFICATE OF CORRECTION

| | | |
|---|---|---|
| PATENT NO. | : 7,729,538 B2 | Page 1 of 1 |
| APPLICATION NO. | : 10/927452 | |
| DATED | : June 1, 2010 | |
| INVENTOR(S) | : Michael Shilman et al. | |

It is certified that error appears in the above-identified patent and that said Letters Patent is hereby corrected as shown below:

In column 23, lines 7-8, in Claim 1, delete " $C(\{V.sub.i\})=.PHI.(R(V.sub.1),R(V.sub.2),\ldots,R(V.sub.n));$ " and insert -- $C(\{V_i\})=\Phi(R(V_1),R(V_2),\ldots,R(V_n));$ --, therefor.

In column 23, line 10, in Claim 1, delete "V,sub.i" and insert -- $v_i$ --, therefor.

In column 23, line 12, in Claim 1, delete ".PHI." and insert -- $\Phi$ --, therefor.

In column 23, line 14, in Claim 1, delete "[V.sub.i]," and insert -- $\{V_i\}$, --, therefor.

In column 23, line 30, in Claim 3, delete "2 dimensional" and insert -- 2-dimensional --, therefor.

In column 23, line 30, in Claim 3, delete "3 dimensional" and insert -- 3-dimensional --, therefor.

In column 25, line 7, in Claim 24, delete " $C(\{V_i\})=\Phi(R(V_1),R(V_2),\ldots,R(V_n));$ " and insert -- $C(\{V_i\})=\Phi(R(V_1),R(V_2),\ldots,R(V_n));$ --, therefor.

In column 26, line 43, in Claim 42, delete " $C(\{V_i\})=\Phi(R(V_1),R(V_2),\ldots,R(V_n));$ " and insert -- $C(\{V_i\})=\Phi(R(V_1),R(V_2),\ldots,R(V_n));$ --, therefor.

Signed and Sealed this
Twenty-second Day of February, 2011

David J. Kappos
*Director of the United States Patent and Trademark Office*